United States Patent
Sturgeon et al.

(10) Patent No.: US 11,223,963 B2
(45) Date of Patent: Jan. 11, 2022

(54) METHOD AND APPARATUS FOR MANAGING ANTENNA TILT

(71) Applicant: TELEFONAKTIEBOLAGET LM ERICSSON (PUBL), Stockholm (SE)

(72) Inventors: Gary Sturgeon, Athlone (IE); Fabrizio Scimia, Athlone (IE); Bryan Lane, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/339,804

(22) PCT Filed: Oct. 28, 2016

(86) PCT No.: PCT/EP2016/076071
§ 371 (c)(1),
(2) Date: Apr. 5, 2019

(87) PCT Pub. No.: WO2018/077420
PCT Pub. Date: May 3, 2018

(65) Prior Publication Data
US 2020/0154285 A1  May 14, 2020

(51) Int. Cl.
*H04W 16/28* (2009.01)
*G06T 17/05* (2011.01)
(Continued)

(52) U.S. Cl.
CPC .............. *H04W 16/28* (2013.01); *G06T 17/05* (2013.01); *H01Q 1/246* (2013.01); *H04W 24/02* (2013.01)

(58) Field of Classification Search
CPC ...... H04W 16/28; H04W 24/02; G06T 17/05; G01C 15/00; H04B 7/00; H01Q 1/246
(Continued)

(56) References Cited

U.S. PATENT DOCUMENTS 6,104,936 A   8/2000  Kronestedt
7,120,431 B1  10/2006 Huo et al.
(Continued)

FOREIGN PATENT DOCUMENTS

CN  1269676 A  10/2000
CN  1280752 A   1/2001
(Continued)

OTHER PUBLICATIONS

ETSI SI GS NFV-MAN 001 V1.1.1, "Network Functions Virtualisation (NFV); Management and Orchestration", Dec. 2014, pp. 1-184.
(Continued)

*Primary Examiner* — Charles N Appiah
*Assistant Examiner* — Frank E Donado
(74) *Attorney, Agent, or Firm* — Patent Portfolio Builders PLLC

(57) ABSTRACT

A method is disclosed for managing tilt of an antenna providing network coverage over a coverage area. The method comprises obtaining an elevation model of the coverage area and calculating obtaining antenna attenuation to points on the elevation model according to a reference antenna tilt angle and a proposed antenna tilt angle. The method further comprises using the calculated obtained attenuations to predict an impact upon network traffic distribution within the coverage area of changing from the reference to the proposed antenna tilt angle, and approving use of the proposed antenna tilt angle if the predicted impact satisfies an acceptability criterion. Also disclosed are an apparatus and a computer program product configured to carry out methods for managing tilt of an antenna.

17 Claims, 19 Drawing Sheets

(51) Int. Cl.
*H01Q 1/24* (2006.01)
*H04W 24/02* (2009.01)

(58) Field of Classification Search
USPC .......................................................... 455/446
See application file for complete search history.

(56) References Cited

U.S. PATENT DOCUMENTS

| | | | |
|---|---|---|---|
| 8,879,400 B2 | 11/2014 | Koike et al. | |
| 2002/0058503 A1 | 5/2002 | Gutowski | |
| 2003/0147353 A1* | 8/2003 | Clarkson | H04W 24/00 370/252 |
| 2007/0127586 A1 | 6/2007 | Hafeez | |
| 2008/0004028 A1* | 1/2008 | Vincent | H04W 16/00 455/446 |
| 2009/0319236 A1* | 12/2009 | Blaunshtein | H04W 16/22 703/1 |
| 2011/0156974 A1 | 6/2011 | Kenington et al. | |
| 2015/0011198 A1 | 1/2015 | Wellington | |
| 2015/0011227 A1 | 1/2015 | Wellington | |
| 2015/0141027 A1 | 5/2015 | Tsui et al. | |
| 2016/0036710 A1* | 2/2016 | Hanaoka | H04W 72/10 370/235 |
| 2017/0070396 A1* | 3/2017 | Flanagan | H04L 41/145 |

FOREIGN PATENT DOCUMENTS

| | | |
|---|---|---|
| CN | 101326741 A | 12/2008 |
| CN | 102812741 A | 12/2012 |
| CN | 103716800 A | 4/2014 |
| CN | 104080094 A | 10/2014 |
| CN | 104519505 A | 4/2015 |
| EP | 1329738 A1 | 7/2003 |
| WO | 2011116092 A1 | 9/2011 |
| WO | 2016137529 A1 | 9/2016 |

OTHER PUBLICATIONS

Huan Cong Nguyen et al., "Validation of Tilt Gain under Realistic Path Loss Model and Network Scenario", 2013 IEEE 78th Vehicular Technology Conference, Sep. 2, 2013, pp. 1-5.

International Search Report and Written Opinion, dated Aug. 4, 2017, from corresponding/related International Application No. PCT/EP2016/076071.

3GPP; "3rd Generation Partnership Project (3GPP); Technical Specification Group Services and System Aspects; Telecommunication management; Study on Operations, Administration and Maintenance (OAM) aspects of Self-Organizing Network (SON) for Active Antenna System (AAS) based deployments; (Release 14)"; 3GPP TR 32.865 V0.4.0 (Aug. 2016) Technical Report; Aug. 2016; 15 pages.

3GPP; 3rd Generation Partnership Project; Technical Specification Group Services and System Aspects; Telecommunication management; Subscriber and equipment trace; Trace concepts and requirements (Release 15); 3 GPP TS 32.421 V15.0.0. (Jun. 2018) Technical Specification; Jun. 2018; 45 pages.

Office Action and Search Report in corresponding/related Chinese Patent Application No. 201680091951.1 dated Nov. 21, 2020.

Nguyen, H.C., et al.; "Validation of Tilt Gain under Realistic Path Loss Model and Network Scenario"; 2013 IEEE 78th Vehicular Technology Conference (VTC Fall); Sep. 2-5, 2013; 5 pages.

Office Action in related/corresponding Chinese Patent Application No. 201680091951.1 dated Oct. 22, 2021.

* cited by examiner

METHOD AND APPARATUS FOR MANAGING ANTENNA TILT

TECHNICAL FIELD

The present invention relates to a method for managing tilt of an antenna providing network coverage over a coverage area. The present invention also relates to an apparatus for managing tilt of an antenna providing network coverage over a coverage area and to a computer program and computer program product configured, when run on a computer, to carry out a method for managing tilt of an antenna providing network coverage over a coverage area.

BACKGROUND

Continuing advances in cellular network capabilities, User Equipments (UEs) and network hardware and software mean that cellular communication networks are now responsible for a huge amount of data transfer, with data demand only set to increase in the foreseeable future. Managing this growing demand and optimising network installations to maximise data transfer capacity is an important ongoing challenge for network operators and providers of both hardware and software.

Communication network coverage over a cell of a cellular network is provided by one or more antennas located at a Radio Base Station and providing radio network access to UEs located in the coverage area of the cell. Network performance experienced by individual UEs is impacted not only by network factors including traffic conditions, network topography etc. but also by antenna performance.

Antenna tilt optimisation is a process in which an operator modifies the tilt of an antenna in order to improve the performance of a cell in terms of coverage, quality and/or capacity. Modifying the tilt angle of an antenna changes the propagation pattern of the cell provisioned by the antenna, that is the strength of the radio waves in a particular direction from the antenna. Antenna tilt thus plays a crucial role in determining the overall coverage area of a cell, with optimal antenna tilt providing important advantages in terms of cell coverage, capacity and network quality, while sub-optimal tilt can have a significant negative impact upon the service experienced by end users of the network. Increasingly in the Self Organising Network (SON) area, products are providing automatic, Remote Electrical Tilt (RET) changes to antennas in order to improve network Key Performance Indicators (KPIs) for a cell.

Methods and apparatus currently exist which provide weighting functions for different antenna patterns and tilt angles based on network performance data. However, such solutions fail to account for the fact that network performance, and in particular antenna performance, may be impacted not only by network factors but also by environmental factors including natural and manmade structures in a coverage area, seasonal variation in foliage, weather changes etc. Making changes to antenna tilt angles without taking such information into account can result in unexpected impacts to network KPIs. In some examples, KPIs may in fact be negatively impacted by an antenna tilt change when positive impacts were predicted by the weighting functions. Effectively managing antenna tilt angles to optimise network performance thus remains an ongoing challenge for the communication network industry.

SUMMARY

It is an aim of the present invention to provide a method, apparatus and computer readable medium which at least partially address one or more of the challenges discussed above.

According to a first aspect of the present invention, there is provided a method for managing tilt of an antenna providing network coverage over a coverage area. The method comprises obtaining an elevation model of the coverage area and obtaining antenna attenuation to points on the elevation model according to a reference antenna tilt angle and a proposed antenna tilt angle. The method further comprises using the obtained attenuations to predict an impact upon network traffic distribution within the coverage area of changing from the reference to the proposed antenna tilt angle, and approving use of the proposed antenna tilt angle if the predicted impact satisfies an acceptability criterion.

According to examples of the present disclosure, the method may be conducted within particular network element or as a virtualised network function.

According to examples of the present disclosure, the acceptability criterion may comprise an impact that is either a positive impact or a negative impact that is within an acceptability threshold. The acceptability criterion may be configurable such that it may be adjusted according to network conditions and network operator proprieties.

According to examples of the present disclosure, the reference antenna tilt angle may be a current antenna tilt angle.

According to examples of the present disclosure, obtaining an elevation model of the coverage area may comprise dividing the coverage area into a plurality of propagation bins and calculating an average elevation of each propagation bin from elevation data for points within each bin.

According to examples of the present disclosure, a propagation bin may comprise a region of the coverage area that spans the entire antenna beamwidth and extends from an inner boundary to an outer boundary. The inner and outer boundaries of propagation bins may be defined in terms of distance from the antenna or in terms of a parameter relating to User Equipment (UE) communication with the antenna, including for example propagation delay in WCDMA (3G) networks or timing advance in GSM (2G) and LTE (4G) networks.

According to examples of the present disclosure, obtaining antenna attenuation to points on the elevation model according to a reference antenna tilt angle and a proposed antenna tilt angle may comprise, for at least one of the reference antenna tilt angle and the proposed antenna tilt angle, obtaining a propagation pattern for the antenna at the relevant tilt angle, calculating a vertical angle from the antenna to points on the elevation model, and determining from the obtained propagation pattern the antenna attenuation at the calculated vertical angles.

According to examples of the present disclosure, the steps of obtaining a propagation pattern for the antenna at the relevant tilt angle, calculating a vertical angle from the antenna to points on the elevation model, and determining from the obtained propagation pattern the antenna attenuation at the calculated vertical angles, may be carried out for both the reference and the proposed antenna tilt angles. This may be the case particularly in examples in which the reference antenna tilt angle is not a current antenna tilt angle.

According to examples of the present disclosure, obtaining antenna attenuation to points on the elevation model according to a reference antenna tilt angle and a proposed antenna tilt angle may comprise, for a current antenna tilt angle, obtaining a measured received signal power at points on the elevation model and calculating from the measured received signal power the antenna attenuation to the points on the elevation model.

According to examples of the present disclosure, obtaining a measured received signal power at points on the elevation model may comprise at least one of obtaining an average received signal power from User Equipments located within a threshold distance of points on the elevation model, or obtaining Traces from User Equipments located within a threshold distance of points on the elevation model. According to examples of the present disclosure, a Trace may comprise a Subscriber and Equipment Trace as defined in 3GPP specification TS 32.421, according to which information relating to a UE and events occurring at the UE may be reported to the network.

According to examples of the present disclosure, calculating antenna attenuation to the points on the elevation model from measured received signal power may comprise comparing the measured received signal power to a transmitted signal power and accounting for factors including free space attenuation and UE antenna gain.

According to examples of the present disclosure, obtaining antenna attenuation to points on the elevation model according to a reference antenna tilt angle and a proposed antenna tilt angle may further comprise determining whether a measured received signal power at points on the elevation model is available and, if a measured received signal power at points on the elevation model is available, obtaining the measured received signal power at points on the elevation model and calculating from the measured received signal power the antenna attenuation to the points on the elevation model at the current tilt angle. If a measured received signal power at points on the elevation model is not available, obtaining antenna attenuation to points on the elevation model may comprise obtaining a propagation pattern for the antenna at the current tilt angle, obtaining a vertical angle from the antenna to points on the elevation model, and determining from the obtained propagation pattern the antenna attenuation at the calculated vertical angles.

According to examples of the present disclosure, obtaining a vertical angle from the antenna to points on the elevation model may comprise calculating the vertical angles or may comprise retrieving previously calculated vertical angles, for example if the angles have already been calculated in the context of the antenna attenuation for the proposed tilt angle.

According to examples of the present disclosure, calculating a vertical angle from the antenna to points on the elevation model may comprise calculating a vertical angle from the antenna to the average elevation at each propagation bin.

According to examples of the present disclosure, using the obtained attenuations to predict an impact upon network traffic distribution within the coverage area of changing from the reference to the proposed antenna tilt angle may comprise obtaining a reference traffic distribution within the coverage area, calculating delta gain values for points on the elevation model by, for each point, subtracting the antenna attenuation at the proposed tilt angle from the antenna attenuation at the reference tilt angle, and predicting a new traffic distribution within the coverage area by combining the calculated delta gains with the reference traffic distribution.

According to examples of the present disclosure, the reference traffic distribution may be a current traffic distribution.

According to examples of the present disclosure, obtaining a reference traffic distribution may comprise obtaining a normalised number of traffic samples within each propagation bin. According to examples of the present disclosure, calculating delta gain values for points on the elevation model may comprise calculating a delta gain value for the average elevation of each propagation bin. According to examples of the present disclosure, predicting a new traffic distribution within the coverage area by combining the calculated delta gains with the reference traffic distribution may comprise, for each propagation bin, calculating a predicted traffic sample value by linearizing the calculated delta gain value for the propagation bin and multiplying the linearized delta gain value by the normalised number of traffic samples for the propagation bin.

According to examples of the present disclosure, obtaining a normalised number of traffic samples within each propagation bin may comprise, for each propagation bin, obtaining a number of traffic samples within the bin and dividing the number of traffic samples within the bin by a total number of traffic samples within the coverage area. In this manner, examples of a reference traffic distribution may place a greater importance on propagation bins containing a greater number of traffic samples.

According to examples of the present disclosure, obtaining a number of traffic samples within a propagation bin may comprise obtaining a number of UEs located within the propagation bin and registered with a cell provisioned with network coverage by the antenna.

According to examples of the present disclosure, obtaining a normalised number of traffic samples within each propagation bin may further comprise, for each propagation bin, weighting the number of traffic samples within the bin according to a relation between average measured received signal power for User Equipments located within the bin and a minimum received signal power required for access to the cell provisioned by the antenna, and weighting the total number of traffic samples within the coverage area according to a relation between average measured received signal power for User Equipments located within the coverage area and the minimum received signal power required for access to the cell provisioned by the antenna.

According to examples of the present disclosure, weighting the number of traffic samples within a bin and the total number of traffic samples within the coverage area may increases the normalised number of traffic samples within the bin as the average measured received signal power for User Equipments located within the bin approaches the minimum received signal power required for access to the cell provisioned by the antenna. In this manner, examples of a reference traffic distribution may place a greater importance on propagation bins in which the average receives signal power is closest to a minimum received signal power required for access to the cell.

According to examples of the present disclosure, using the obtained attenuations to predict an impact upon network traffic distribution within the coverage area of changing from the reference to the proposed antenna tilt angle may further comprise generating an initial predicted coverage loss value by summing the predicted traffic sample values for each of the propagation bins.

According to examples of the present disclosure, generating the initial predicted coverage loss value may further comprise subtracting 1 from the summed predicted traffic values.

According to further examples of the present disclosure, obtaining a reference traffic distribution may comprise obtaining a measured received signal power for User Equipments in each propagation bin. According to examples of the present disclosure, calculating delta gain values for points on the elevation model may comprise calculating a delta gain value for the average elevation of each propagation bin. According to examples of the present disclosure, predicting a new traffic distribution within the coverage area by combining the calculated delta gains with the reference traffic distribution may comprise, for each propagation bin, calculating a predicted received signal power for User Equipments in the propagation bin by adding the calculated delta gain value for the propagation bin to the measured received signal power of User Equipments in the propagation bin.

According to examples of the present disclosure, using the obtained attenuations to predict an impact upon network traffic distribution within the coverage area of changing from the reference to the proposed antenna tilt angle may comprise, for each propagation bin, calculating a percentage of User Equipments in the propagation bin for which the predicted received signal power is below a minimum received signal power required for access to the cell provisioned by the antenna.

According to examples of the present disclosure, using the obtained attenuations to predict an impact upon network traffic distribution within the coverage area of changing from the reference to the proposed antenna tilt angle may further comprise generating an initial predicted coverage loss value by summing the calculated percentage of User Equipments for each of the propagation bins.

According to examples of the present disclosure, using the obtained attenuations to predict an impact upon network traffic distribution within the coverage area of changing from the reference to the proposed antenna tilt angle may further comprise calculating a final predicted coverage loss value, wherein the final predicted coverage loss value comprises a weighted sum of inputs including the initial predicted coverage loss value.

According to examples of the present disclosure, remaining inputs of the weighted sum may comprise features of the network cell provisioned by the antenna.

According to examples of the present disclosure, the cell features may include at least one of: cell range, cell power share; inter-site distance; traffic voice share, traffic data share, traffic voice, traffic data and/or average active set size.

According to examples of the present disclosure, the weighting coefficients of the weighted sum may be determined by a machine learning algorithm.

According to examples of the present disclosure, the method may further comprise, if the proposed antenna tilt angle is approved, obtaining an actual coverage loss value following implementation of the proposed antenna tilt, and inputting the actual coverage loss value to the machine learning algorithm to refine the weighting coefficients.

According to examples of the present disclosure, the method may further comprise selecting a set of weighting coefficients for the weighted sum according to a category of the network cell provisioned by the antenna.

According to examples of the present disclosure, cell category may be determined by at least one of cell bandwidth, cell technology, number of UARFCNs in the same sector or band, and/or sector configuration.

According to examples of the present disclosure, the method may further comprise, if the predicted impact does not satisfy the acceptability criterion, rejecting use of the proposed antenna tilt angle and assembling a range of alternative proposed antenna tilt angles, the alternative proposed antenna tilt angles being within a threshold margin of the reference antenna tilt angle. The method may further comprise calculating antenna attenuation to points on the elevation model according to the alternative proposed antenna tilt angles, using the calculated attenuations to predict impacts upon network traffic distribution within the coverage area of changing from the reference to the alternative proposed antenna tilt angles, and, if any of the predicted impacts satisfy the acceptability criterion, approving use of the corresponding alternative proposed antenna tilt angle.

According to examples of the present disclosure, the proposed antenna tilt angle may be generated by one of a network operator and/or an optimisation function. The optimisation function may for example be a Remote Electrical Tilt (RET) function in a Self Organising Network (SON).

According to another example of the present disclosure, there is provided a computer program comprising instructions which, when executed on at least one processor, cause the at least one processor to carry out a method according to any one of the preceding aspects or examples of the present disclosure.

According to another example of the present disclosure, there is provided a carrier containing a computer program according to the preceding aspect of the present disclosure, wherein the carrier comprises one of an electronic signal, optical signal, radio signal or computer readable storage medium.

According to another example of the present disclosure, there is provided a computer program product comprising non transitory computer readable media having stored thereon a computer program according to a preceding aspect of the present disclosure.

According to another example of the present disclosure, there is provided apparatus for managing tilt of an antenna providing network coverage over a coverage area. The apparatus comprises a processor and a memory, the memory containing instructions executable by the processor such that the apparatus is operative to obtain an elevation model of the coverage area and obtain antenna attenuation to points on the elevation model according to a reference antenna tilt angle and a proposed antenna tilt angle. The apparatus is further operative to use the obtained attenuations to predict an impact upon network traffic distribution within the coverage area of changing from the reference to the proposed antenna tilt angle, and approve use of the proposed antenna tilt angle if the predicted impact satisfies an acceptability criterion.

According to another example of the present disclosure, there is provided apparatus for managing tilt of an antenna providing network coverage over a coverage area. The apparatus is adapted to obtain an elevation model of the coverage area and obtain antenna attenuation to points on the elevation model according to a reference antenna tilt angle and a proposed antenna tilt angle. The apparatus is further operative to use the obtained attenuations to predict an impact upon network traffic distribution within the coverage area of changing from the reference to the proposed antenna tilt angle and approve use of the proposed antenna tilt angle if the predicted impact satisfies an acceptability criterion.

According to another example of the present disclosure, there is provided apparatus for managing tilt of an antenna providing network coverage over a coverage area. The apparatus comprises an elevation module for obtaining an elevation model of the coverage area and an antenna propagation module for obtaining antenna attenuation to points on the elevation model according to a reference antenna tilt angle and a proposed antenna tilt angle. The apparatus further comprises an impact module for using the obtained attenuations to predict an impact upon network traffic distribution within the coverage area of changing from the reference to the proposed antenna tilt angle, and a feedback module for approving use of the proposed antenna tilt angle if the predicted impact satisfies an acceptability criterion.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present disclosure provide a method and apparatus permitting the evaluation of a proposed antenna tilt angle by predicting an impact upon network traffic distribution within a coverage area of the antenna of changing from a reference tilt angle to the proposed tilt angle. According to different examples of the present disclosure, local topography, network user distribution and antenna propagation patterns may be taken into account in assessing the impact of changing to a proposed antenna tilt angle. In some examples, a proposed antenna tilt angle may be approved or rejected on the basis of an acceptability criterion for the predicted impact, and alternative proposed antenna tilt angles may be assessed and approved.

Figure 1:
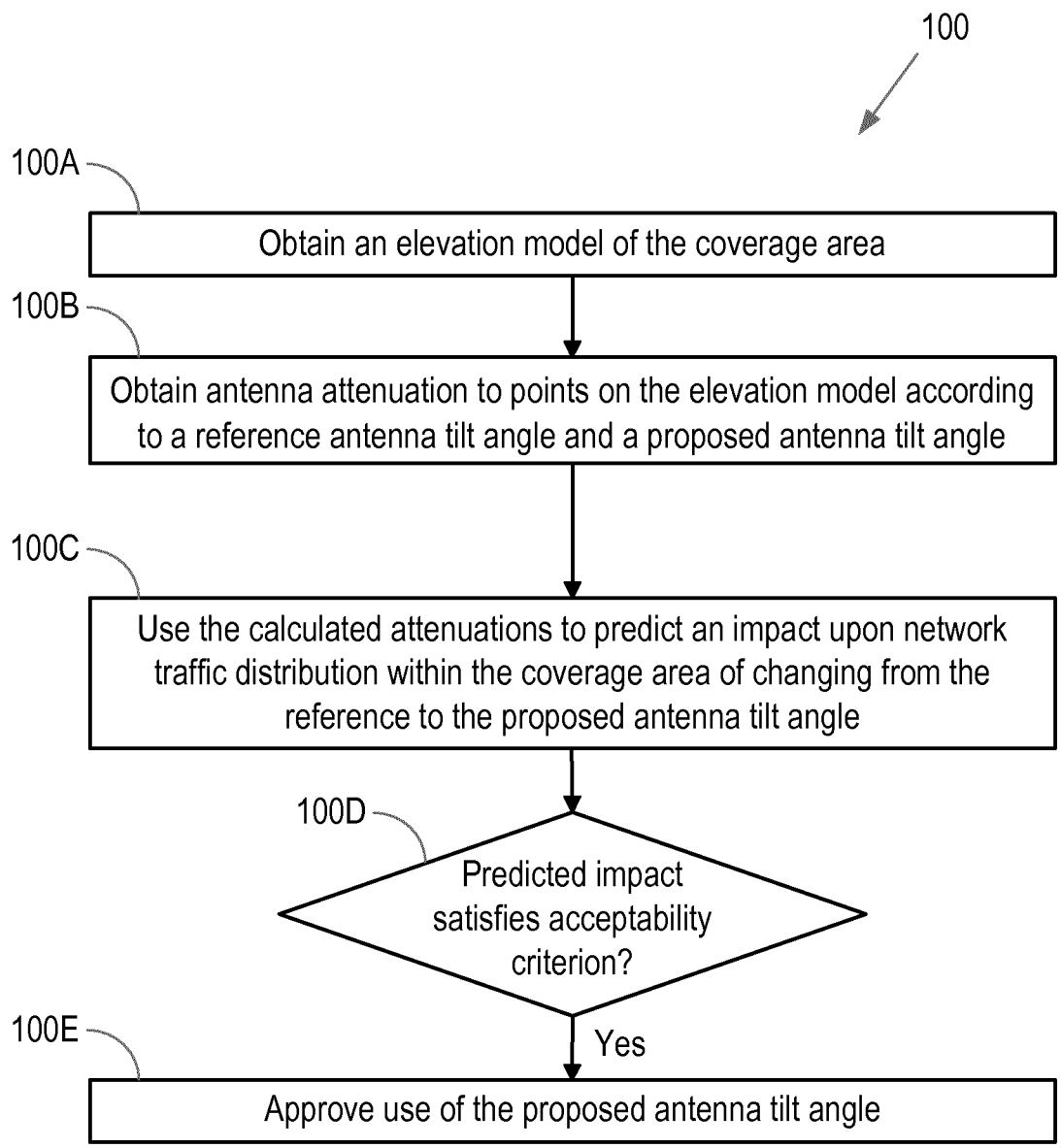
FIG. 1 is a flow chart illustrating process steps in a method for managing tilt of an antenna.

FIG. 1 is a flow chart illustrating process steps in a method 100 according to an example of the present disclosure. The method 100 is for managing tilt of an antenna providing network coverage over a coverage area. Referring to FIG. 1, in a first step 100A, the method comprises obtaining an elevation model of the coverage area. This may for example comprise consulting digital elevation records for the location of the coverage area in order to construct the elevation model. At step 100B, the method comprises obtaining antenna attenuation to points on the elevation model according to a reference antenna tilt angle and a proposed antenna tilt angle. The reference antenna tilt angle may for example be a current antenna tilt angle. At step 100C, the method comprises using the obtained attenuations to predict an impact upon network traffic distribution within the coverage area of changing from the reference to the proposed antenna tilt angle. At step 100D, the method comprises assessing whether or not the predicted impact satisfies an acceptability criterion. Finally, if the predicted impact does satisfy the acceptability criterion, the method comprises, at step 100E, approving use of the proposed antenna tilt angle.

Figure 2:
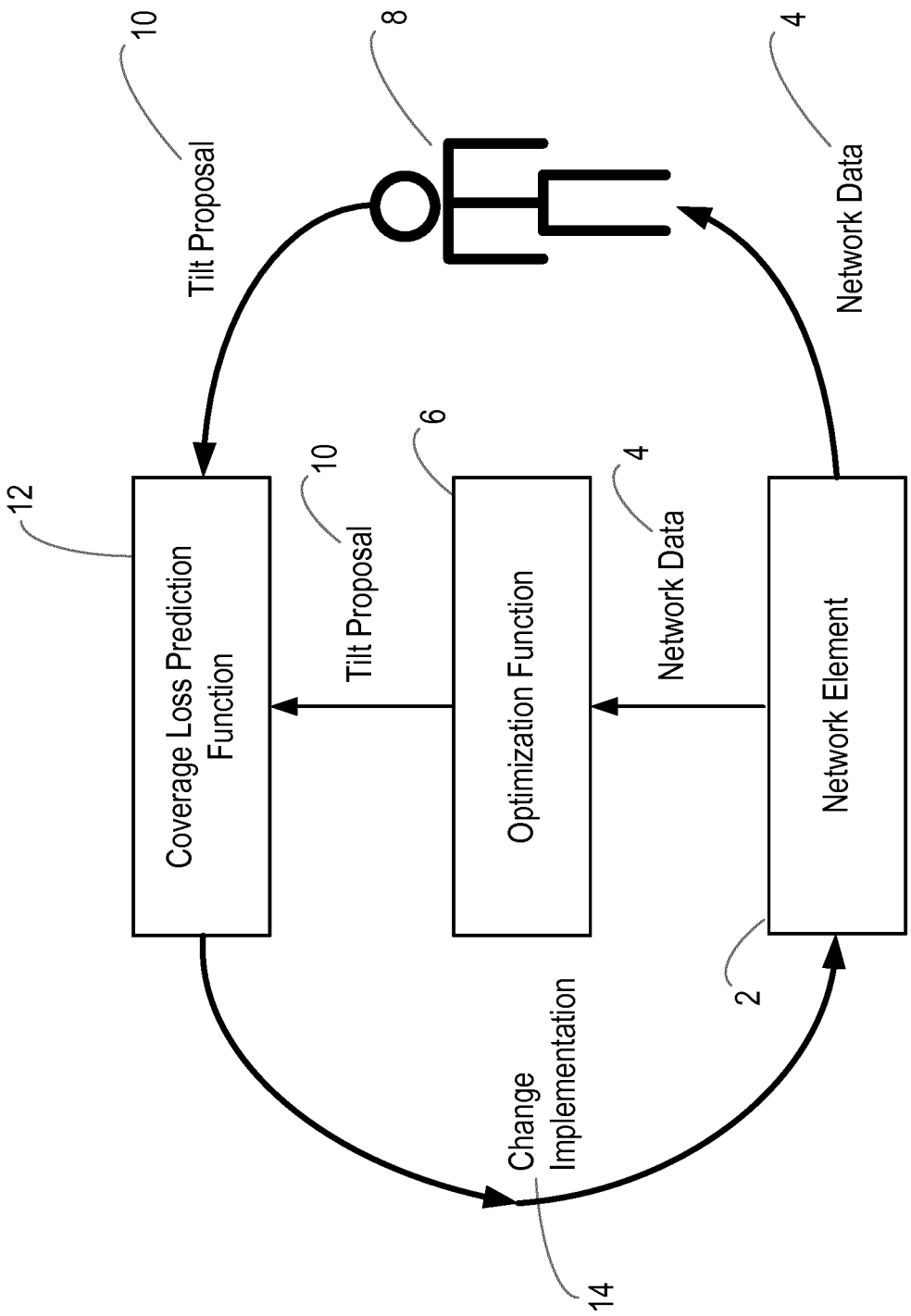
FIG. 2 is a block diagram illustrating application of the method of FIG. 1 as part of an optimisation loop.

The method 100 may be performed as part of ongoing network management and optimisation processes. Owing to the potential impact on other network elements of making antenna tilt changes, and limitations on data sharing between network interfaces, it may be appropriate for management of antenna tilt angle to be performed at network management level, rather than at a network element level. The method may thus be performed in a management element or by a management function, which may for example be a Virtualised Network Function (VNF). FIG. 2 illustrates where the method 100 may fit into a network management process, for example as part of an optimisation loop for antenna tilt. Referring to FIG. 2, a network element 2 may collect network data 4, which data may be provided to an optimisation function 6 and/or to a network engineer 8. The network data may include a wide range of data pertaining to the functioning of the network and/or the level of service or performance experienced by users of the network. On the basis of the network data 4, the optimisation function 6 and/or network engineer 8 may generate a tilt proposal 10, comprising a proposed tilt angle for one or more antennas within the network. The proposed tilt angle may be submitted to an element or function performing the method 100, illustrated in FIG. 2 as Coverage Loss Prediction Function 12. If approved, the proposed tilt angle may be implemented as illustrated at 14, resulting in a change to network performance. This change may be reflected in new network data 4 collected by the network element 2 and forwarded to the optimisation function 6 and/or network engineer 8. New tilt proposals may be generated on the basis of the new network data, which proposals may be evaluated and approved or rejected by the Coverage Loss Prediction Function 12.

FIG. 2 illustrates how the method 100 may be used for the evaluation of both manual antenna tilt changes proposed by a network engineer, and also automated antenna tilt changes, for example proposed by a Remote Antenna Tilt (RET) function as part of a Self Organising Network (SON) environment.

FIGS. 3a to 3f show a flow chart illustrating process steps in another example of method 200 for managing tilt of an antenna providing network coverage over a coverage area. The antenna may for example be a sector antenna, providing network coverage over a sector shaped coverage area defined by an angular beamwidth and extending from the location of the antenna to a maximum coverage radius. The steps of the method 200 illustrate one way in which the steps of the method 100 may be subdivided and supplemented in order to achieve the above discussed and additional functionality. As in the case of the method 100, the method 200 may be performed by a network management element or function, and in the following discussion, for the purposes of illustration only, the method 200 is described as being conducted by a Coverage Loss Prediction (CLP) Function.

Figure 3A:
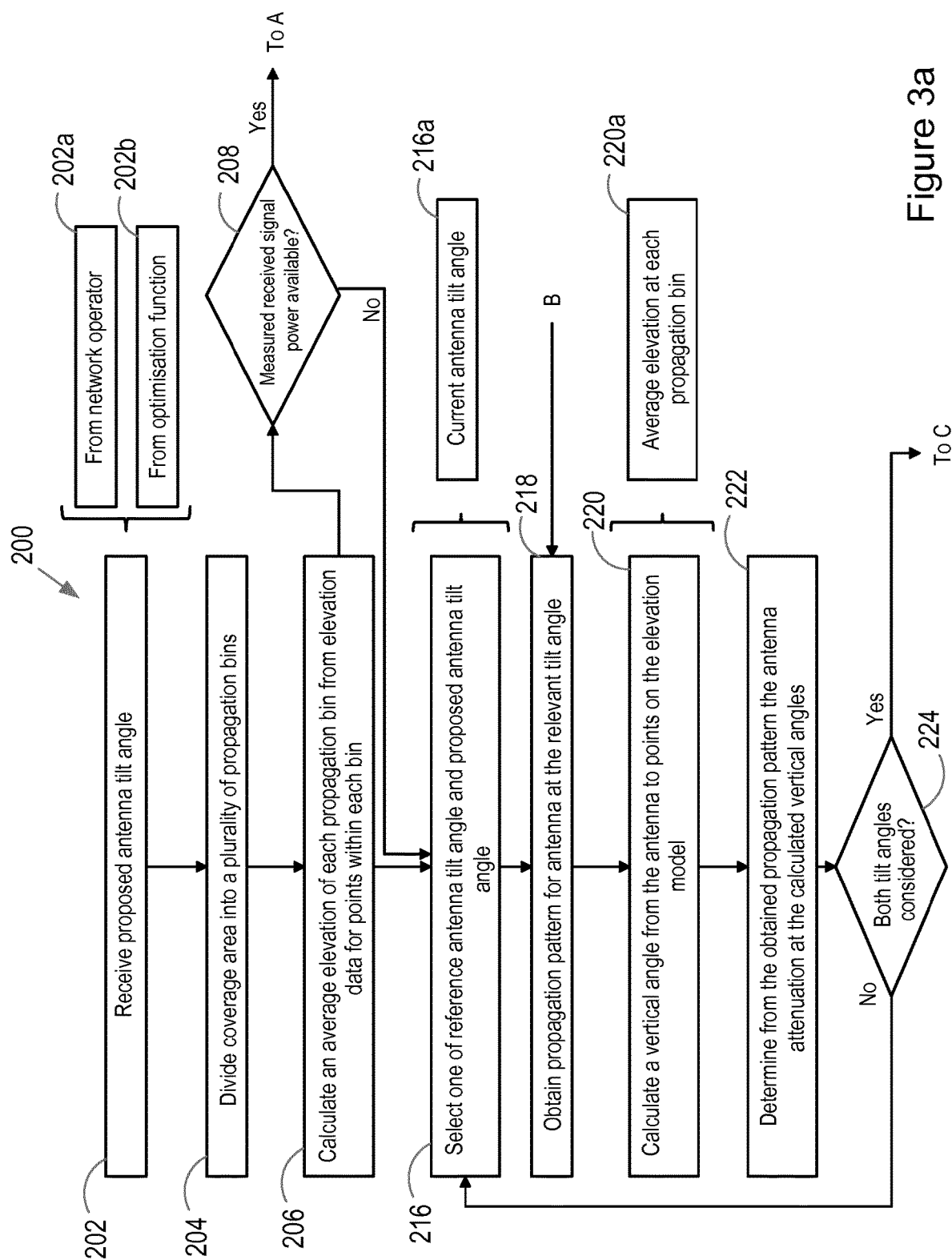
FIGS. 3a to 3f are flow charts illustrating process steps in another example of method for managing tilt of an antenna.

Referring first to FIG. 3a, in a first step 202, the CLP Function receives a proposed antenna tilt angle. As discussed above with reference to FIG. 2, the proposed antenna tilt angle may be received from a network operator at step 202a, or from an optimisation function at step 202b, for example as part of a RET function within a SON environment. The method 200 assesses the proposed antenna tilt angle against a reference antenna tilt angle, which may in many circumstances be a current antenna tilt angle, although other reference antenna tilt angles may be envisaged. If the reference antenna tilt angle is a current antenna tilt angle, then measurements from UEs within the coverage area may be used to assist in several of the assessment steps, as detailed below. If the reference antenna tilt angle is not a current antenna tilt angle, then such measurements will not be used. Even when the reference antenna tilt angle is a current antenna tilt angle, UE measurements may not always be available, and thus the following discussion covers examples of the method in which UE measurements are used as well as examples in which UE measurements are not used.

Figure 4:
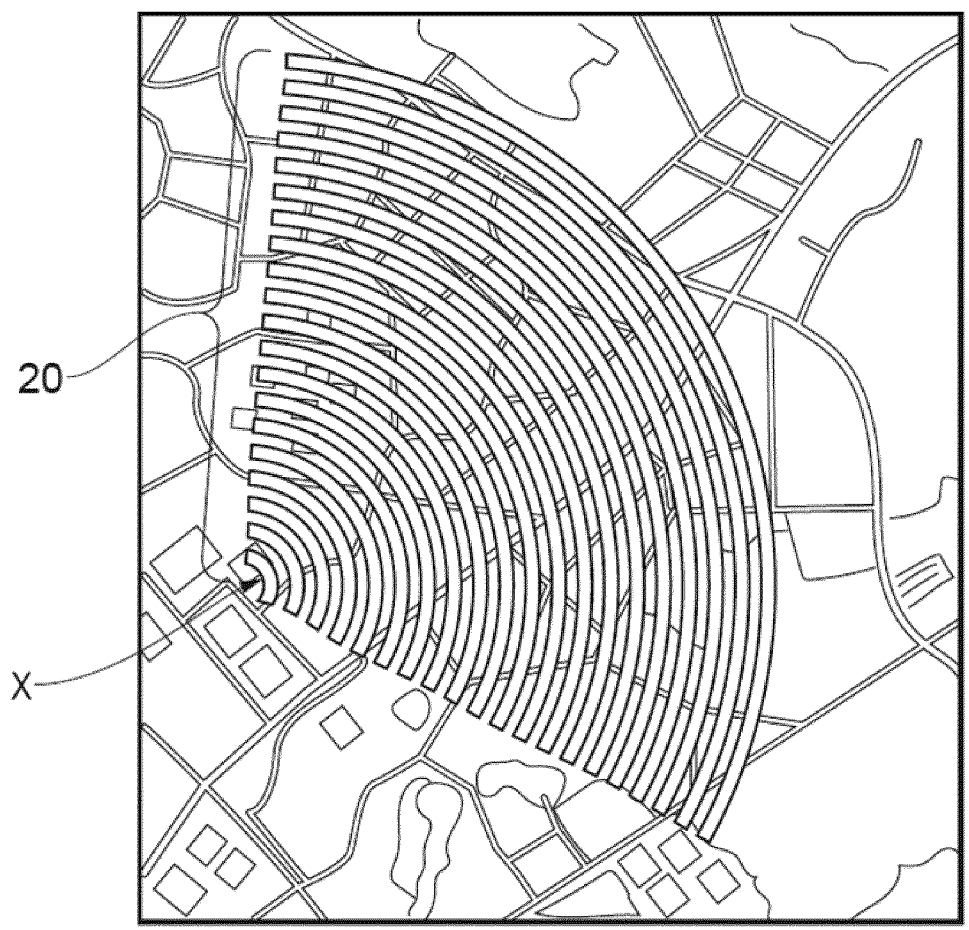
FIG. 4 is a representation of antenna propagation bins.

In step 204, the CLP Function divides the coverage area into a plurality of propagation bins. This division may be newly performed each time the CLP Function performs the method 200, or the CLP Function may retrieve an existing division of the coverage area, for example if step 202 has already been performed in the context of a previously received proposed tilt angle. A geographic representation of antenna propagation bins is illustrated in FIG. 4. Referring to FIG. 4, the antenna position is marked as X, with a plurality of propagation bins 20 extending radially outward from the antenna position X. Each propagation bin spans the entire antenna beamwidth and extends from an inner boundary to an outer boundary. The inner and outer boundaries of propagation bins may be defined in terms of distance from the antenna or in terms of a parameter relating to User Equipment (UE) communication with the antenna, including for example propagation delay in WCDMA (3G) networks or timing advance in GSM (2G) and LTE (4G) networks.

Figure 5:
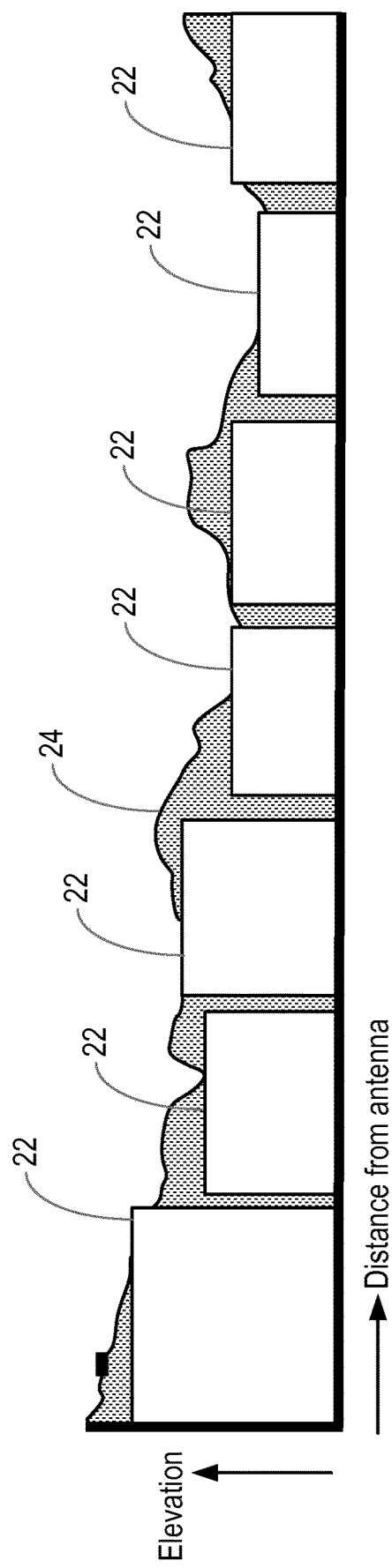
FIG. 5 is a representation of an elevation model for an antenna coverage area.

In step 206, the CLP Function obtains an elevation model of the coverage area by calculating an average elevation of each propagation bin from elevation data for points within each propagation bin. Digital elevation data may be obtained from publicly available maps or online databases for the geographic region concerned. Such digital elevation information may be used together with the position of the antenna and its azimuth (or direction) and elevation to obtain an elevation for a range of points within each elevation bin. The elevation of individual points within a propagation bin may then be averaged to obtain an average elevation for each propagation bin. FIG. 5 illustrates an example elevation model which may be generated at step 206. Referring to FIG. 5, average elevation 22 for a plurality of propagation bins 20 is overlaid on a graph 24 representing elevation variation at increasing distance from an antenna position. The number of points for which elevation is evaluated in each bin may be chosen according to the degree of accuracy desired for the average elevation of the bin. The points may be selected at equal angular separation around the antenna beamwidth, and may be selected to be substantially equidistant from the inner and outer propagation bin boundaries. In one example, for a 60° antenna beamwidth, 5 points may be selected at 15° spacing. Formulae which may be used to construct an elevation model such as the model of FIG. 5 are provided below. Inputs to the formulae include the Latitude and Longitude of the antenna position, the azimuth of the antenna and timing advance distance of the point under consideration:

$$Lat_{newpoint} = \\ \mathrm{asin}\left(\sin(Lat_{cell}) \times \cos\left(\frac{d_{ta}}{R}\right) + \cos(Lat_{cell}) \times \sin\left(\frac{d_{ta}}{R}\right) \times \cos(\text{Bearing})\right)$$

$$Long_{newpoint} = Long_{cell} + \mathrm{atan2}\left(\sin(\text{Bearing}) \times \sin\left(\frac{d_{ta}}{R}\right) \times \cos(Lat_{cell}),\right.\\ \left.\cos\left(\frac{d_{ta}}{R}\right) - \sin(Lat_{cell}) \times \sin(Lat_{newpoint})\right)$$

Where:
R=Radius of the Earth
$Cell_{Azimuth}$=Direction of cell antenna
$d_{ta}$=Timing Advance distance in km's
$Lat_{cell}$=Latitude of the Cell in radians
$Long_{cell}$=Longitude of the Cell in radians
$Azimuth_{offset}$=angle offset within the cell's beamwidth
Bearing=radian ($Cell_{Azimuth}$+$Azimuth_{offset}$)

Figure 3B:
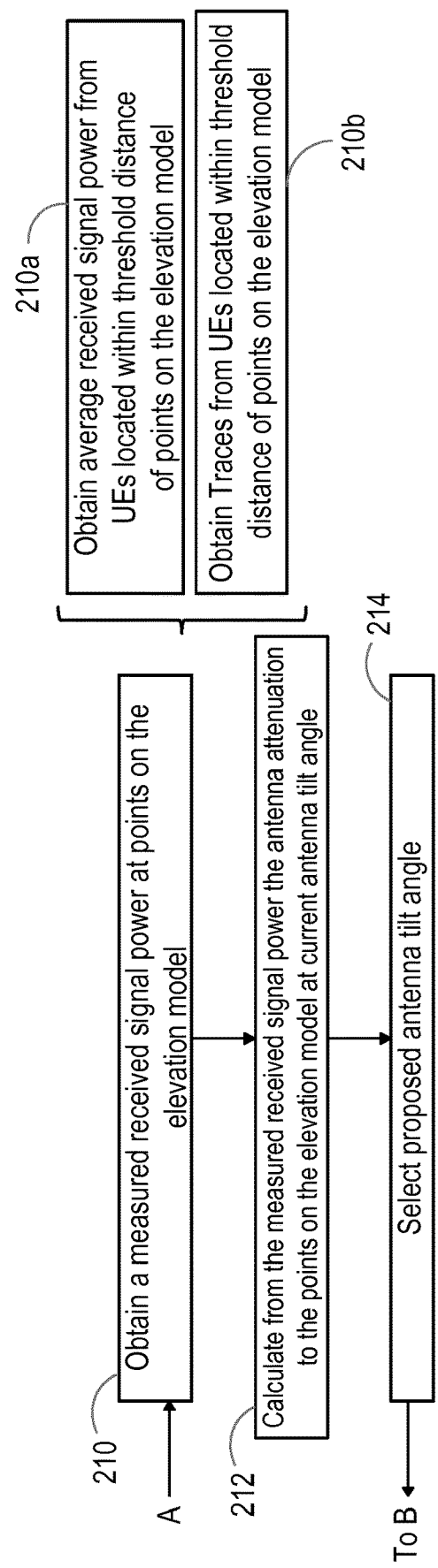
Figure 3C:
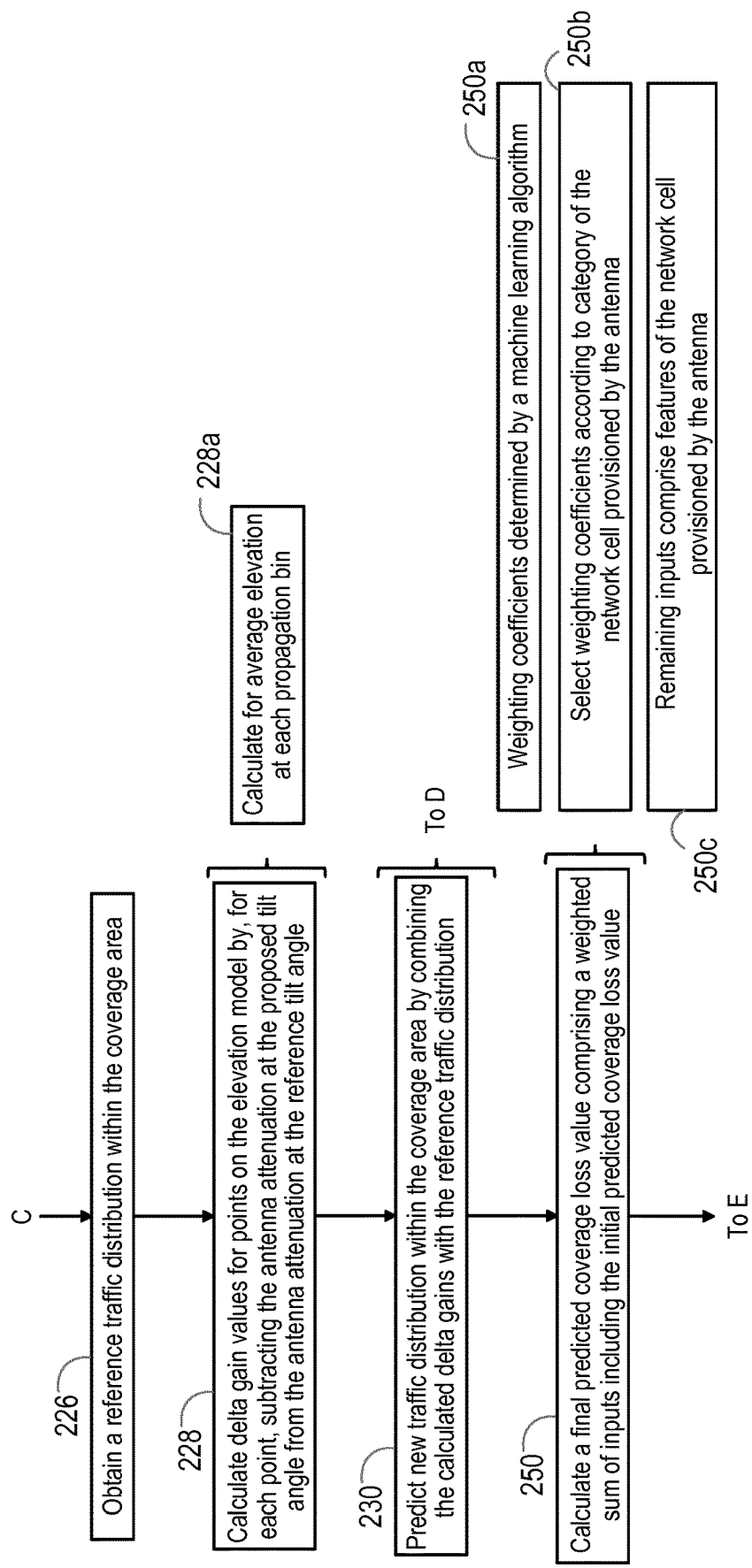

Referring again to FIG. 3a, once an average elevation for each propagation bin has been calculated, the CLP Function then determines, at step 208 whether a measured received signal power for UEs in the coverage area is available. In some examples, performing step 208 may be made conditional upon the reference antenna tilt angle being a current antenna tilt angle, as such measurements are only of relevance for a current antenna tilt angle, as discussed above. Measured received signal power may for example be available in the form of counters or of UE Traces. Counters may for example enable the calculation of an average received signal power for each propagation bin. This may for example be an average Common Pilot Channel (CPICH) power for 3G networks, a Reference Signal Power for 4G networks, or other signal powers, depending upon the Radio Access Technology off the network. As discussed above, a UE Trace may comprise a Subscriber and Equipment Trace as defined in 3GPP specification TS 32.421, according to which information relating to a UE and events occurring at the UE may be reported to the network. UE Traces may therefore provide information such as the actual measured received signal power at each UE within the propagation bin. If measured received signal power is available (yes at step 208), the CLP Function proceeds, as illustrated in FIG. 3b, to obtain a measured received signal power at points on the elevation model in step 210. As discussed above, this may comprise obtaining an average received CPICH power from UEs located within a threshold distance of points on the elevation model at step 210a. In other examples, obtaining a measured received signal power at points on the elevation model may comprise obtaining Traces from UEs located within a threshold distance of points on the elevation model in step 210b. In either step 210a or 210b, if the points on the elevation model comprise the average elevation at each propagation bin, UEs within a threshold distance may for example include all UEs within the bin.

The measured received signal powers may enable the calculation at step 212 of a current antenna attenuation to the points on the elevation model. As discussed above, these points may be the average elevation of each propagation bin, calculated at step 206. The antenna gain at each point may be calculated by comparing the measured received signal power at the relevant point with a transmitted signal power and then accounting for free space attenuation, UE antenna gain and any other factors which may influence received signal power other than the antenna attenuation.

After calculating the antenna attenuation to points on the elevation model, for example the average elevation at each propagation bin, at the current antenna angle, the CLP Function then selects, at step 214, the proposed antenna tilt angle, before proceeding to obtain a propagation pattern for the antenna at the proposed tilt angle in step 218, as discussed in further detail below.

Figure 7:
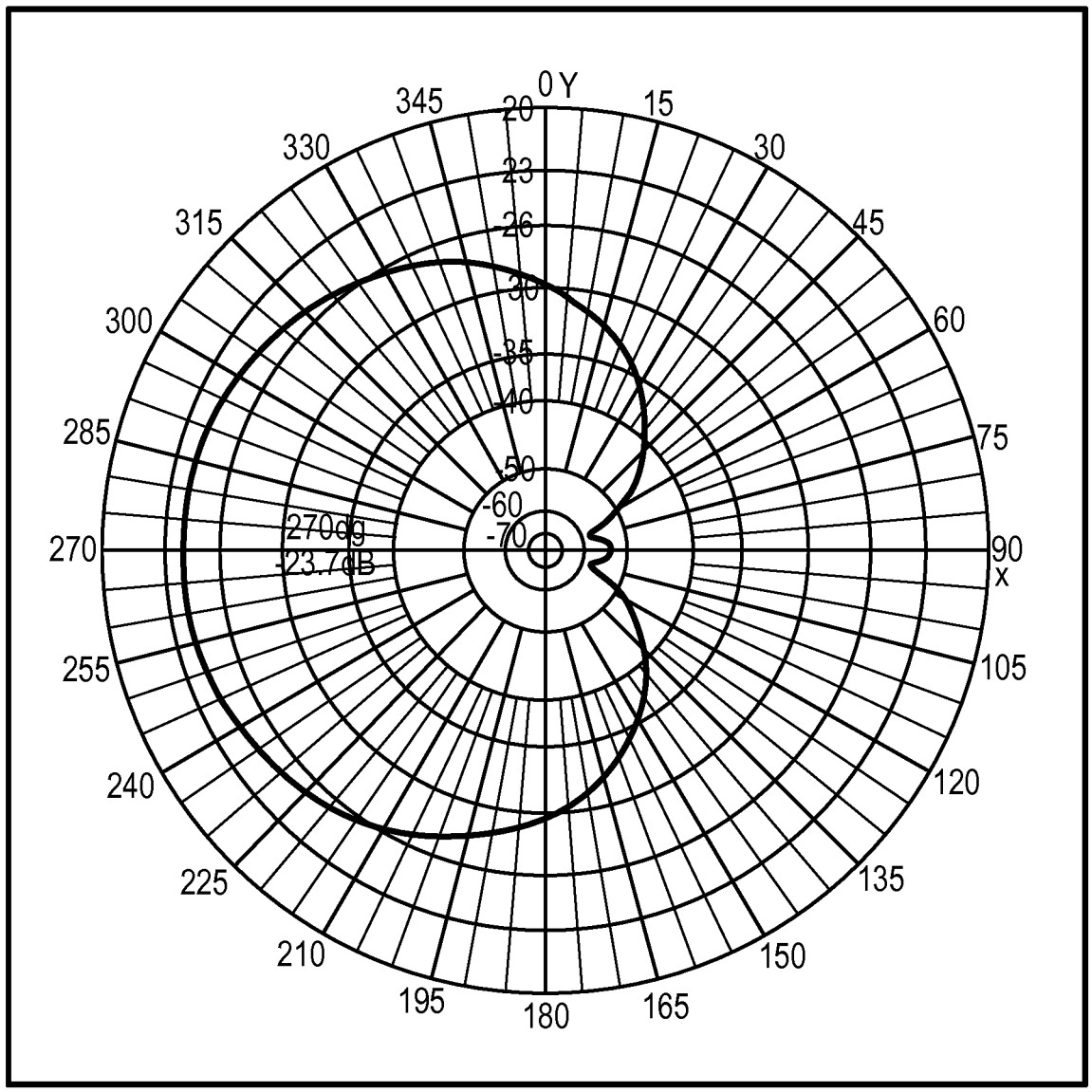
FIG. 7 is a representation of an antenna propagation pattern.

Referring again to FIG. 3*a*, if measured received signal power is not available (No at step 208), the CLP Function proceeds at step 216 to select one of a reference antenna tilt angle and the proposed antenna tilt angle. As illustrated in step 216*a* and discussed above, the reference antenna tilt angle may be a current antenna tilt angle. The CLP Function then proceeds to obtain a propagation pattern for the antenna at the relevant tilt angle. If the CLP Function has performed steps 210 to 214, this will be the proposed tilt angle, selected at step 214. If the CLP Function has not performed steps 210 to 214, the relevant tilt angle will be whichever of the reference (for example current) or proposed tilt angle was selected at step 216. An example antenna propagation pattern is illustrated in FIG. 7. Each Antenna type and model has a different propagation pattern, which is dictated by the hardware build of the antenna, antenna power, and also the degree of tilt of the antenna. At different degrees of tilt, the propagation pattern for an individual antenna will change. Step 218 therefore comprises obtaining, for example by retrieving from a memory or requesting from an appropriate source, the propagation pattern for the antenna at the tilt angle selected in step 216 or 214.

Figure 6:
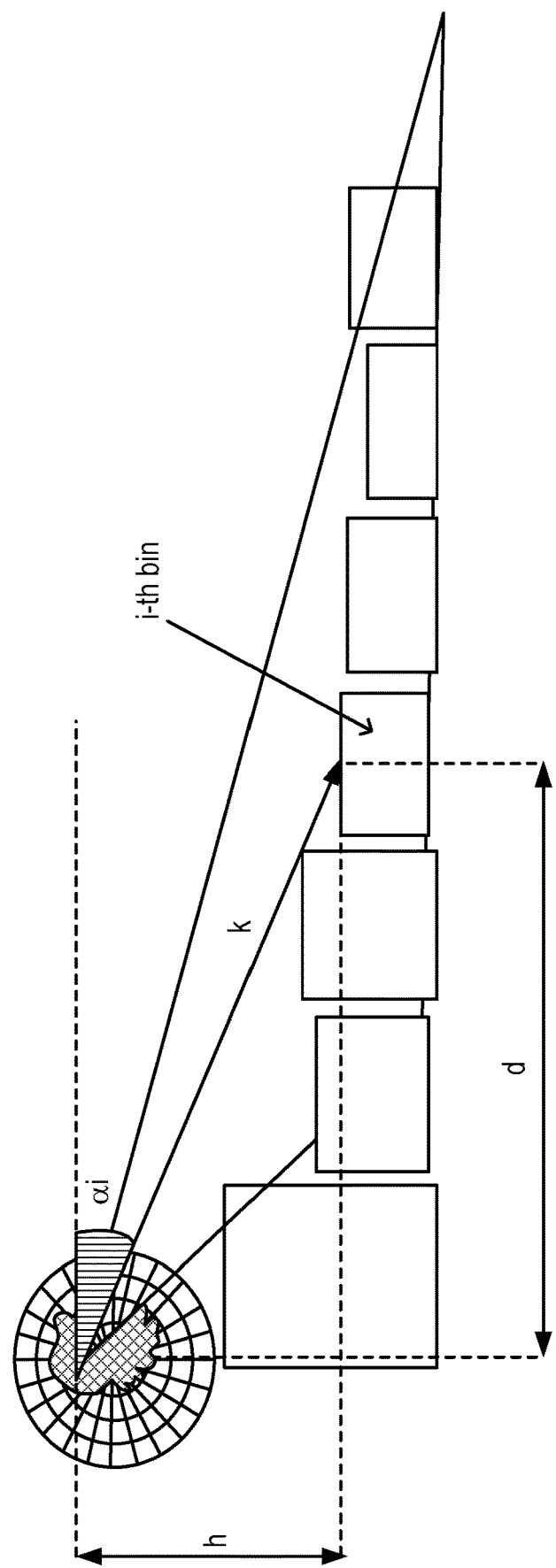
FIG. 6 is a representation of antenna propagation to points on an elevation model.

Having obtained the antenna propagation pattern, the CLP Function then calculates a vertical angle from the antenna to points on the elevation model, which points may be the average elevation at each propagation bin, as discussed above and illustrated at step 220*a*. This calculation is illustrated in FIG. 6, with the angle $\alpha_i$ being the vertical angle from the antenna elevation to the average elevation at the ith propagation bin:

$$\alpha_i = \tan^{-1}\left(\frac{h}{d}\right)$$

Figure 3D:
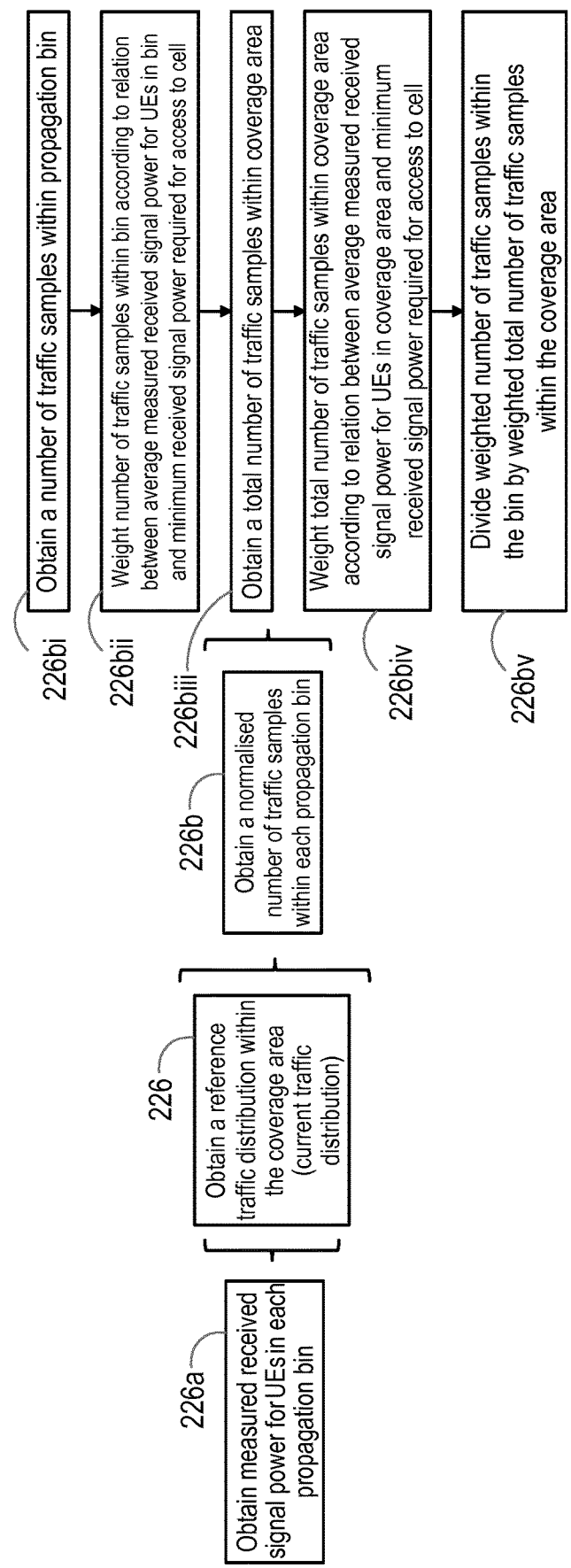

The CLP Function then determines from the propagation pattern obtained at step 218 the antenna attenuation for the relevant antenna tilt angle at the calculated vertical angles. In step 224, the CLP Function checks whether both tilt angles have been considered, either through the steps 216 to 222 or via steps 210 to 214. If both angles have not yet been considered, the CLP Function returns to step 216 to select the other tilt angle. Once both tilt angles have been considered, the CLP Function proceeds to step 226, illustrated in FIG. 3*c*, and obtains a reference traffic distribution within the coverage area. If the reference tilt angle is a current tilt angle, then the reference traffic distribution may be a current traffic distribution. FIG. 3*d* illustrates in greater detail the steps that may be involved in obtaining a reference traffic distribution.

Figure 9:
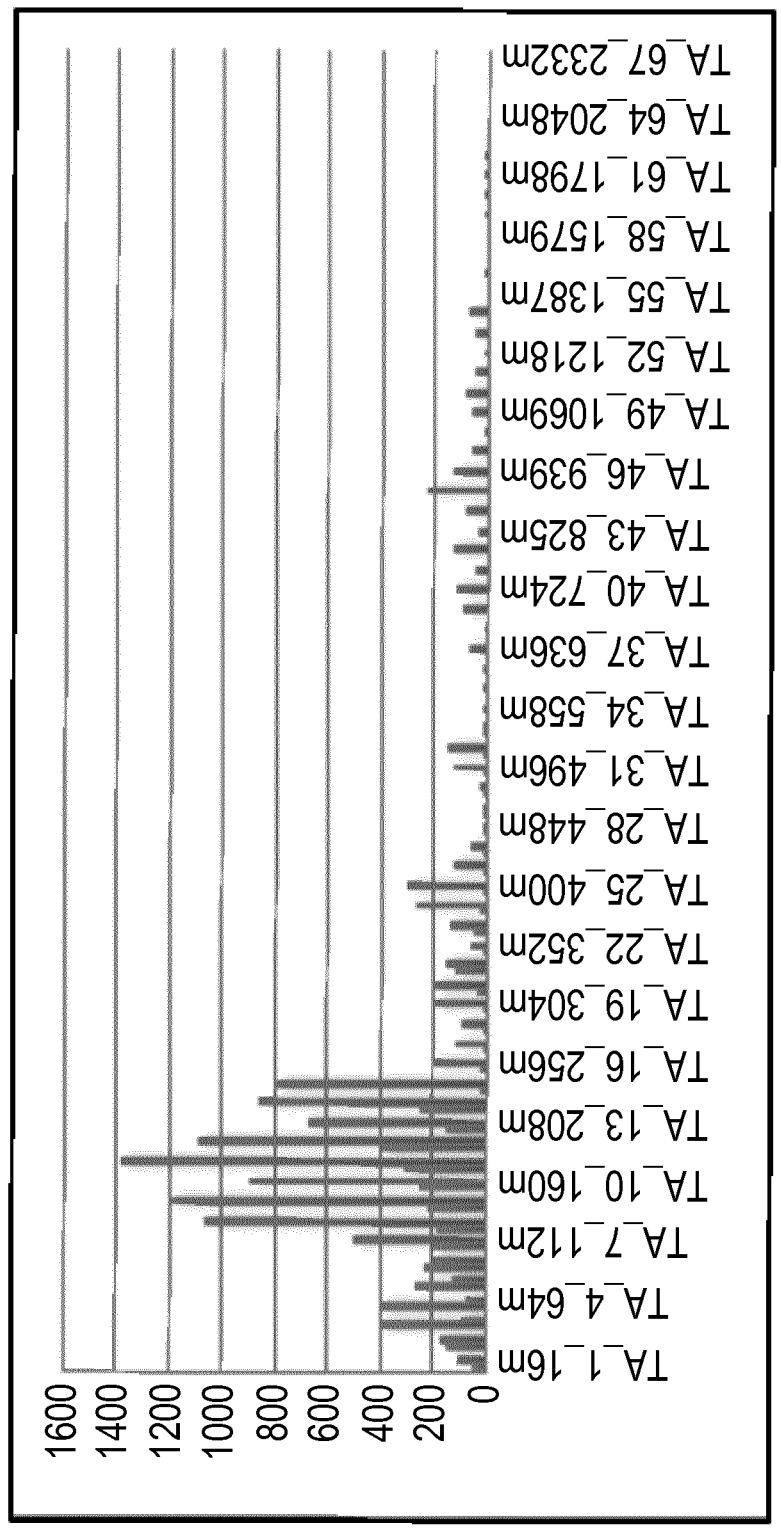
FIG. 9 is a graphical representation of a user traffic distribution.

Referring to FIG. 3*d*, the nature of the reference traffic distribution obtained may depend upon the nature of UE measurement information available. If UE Traces are available, then obtaining a reference (current) UE traffic distribution may comprise obtaining measured received signal power for UEs in each propagation bin, as illustrated in step 226*a*. If UE Traces are not available, then obtaining a reference (current) traffic distribution may comprise, at step 226*b*, obtaining a normalised number of traffic samples within each propagation bin. Normalising the number of traffic samples may enable the CLP to place a greater importance on certain bins, as discussed in greater detail below. In a first example, in which no UE measurement information is available, or in which such information is not to be considered, obtaining a normalised number of traffic samples in each propagation bin first comprises, at step 226*bi*, obtaining a number of traffic samples within each propagation bin. An example graph illustrating traffic samples per propagation bin is illustrated in FIG. 9. A total number of traffic samples within the coverage area is then obtained at step 226*biii* before obtaining a normalised number for each bin by dividing the number of samples for each bin by the total number of samples for the coverage area in step 226*bv*. The normalised number of samples s'$_i$ for the ith bin according to this first example is thus calculated as:

$$s'_i = \frac{s_i}{\sum_{1}^{B} s_k}$$

Figure 10:
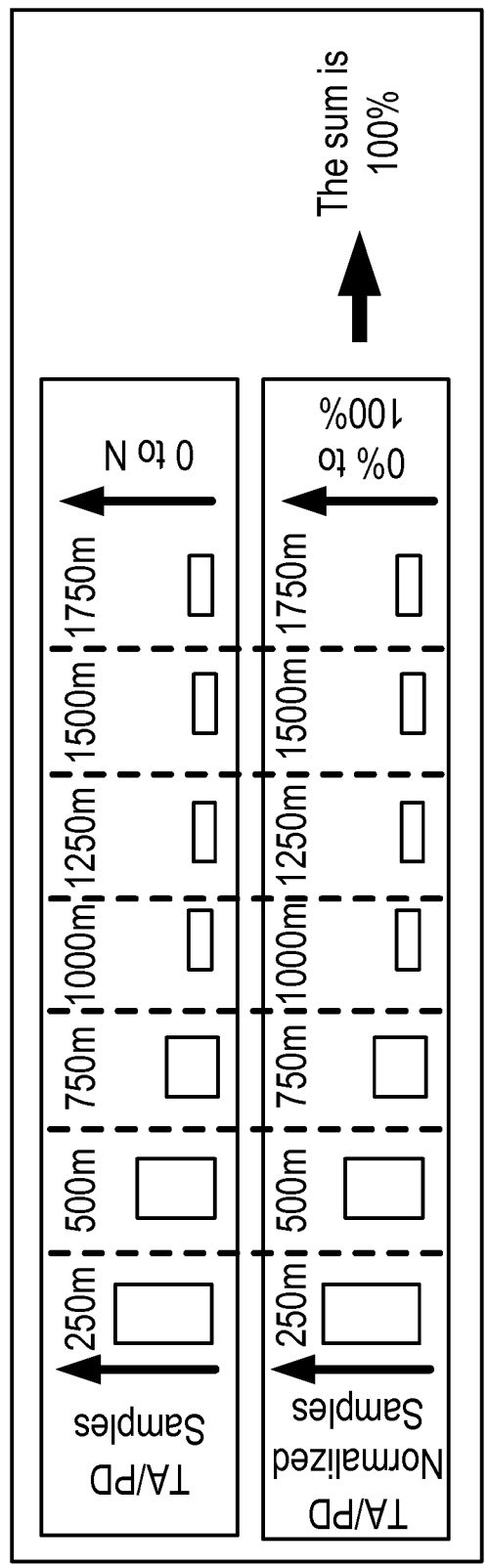
FIG. 10 illustrates a normalised user traffic distribution.

Where:
$s_i$=number of samples in the i-th bin
$s'_i$=normalized number of samples in the i-th bin
B=total number of bins In this first example, the normalized number of traffic samples per bin places a higher importance on those bins having a greater concentration of traffic samples, and hence of UEs. FIG. 10 illustrates example traffic samples per propagation bin before and after normalisation.

In another example, in which UE counters are available, this information may be used in calculating the normalized number of traffic samples to place a greater importance on those bins in which the average received signal power is close to a minimum signal power required for access to the cell provisioned by the antenna. In 3G networks, this minimum power level is referred to as QRSCPmin, other networks have other definitions but the concept of a minimum received power level for cell exists in substantially all network technologies. QRSCPmin is referred to in the following example but it will be appreciated that this is merely for the purposes of illustration, and other minimum received power values may be substituted for QRSCPmin. In order to provide greater importance to propagation bins in which the average received signal power is closest to the minimum level for cell access, weighting values R may be calculated and applied to both the number of traffic samples per bin (R'$_i$ for the ith bin) and the total number of traffic samples in the coverage area.

For an individual propagation bin i, the weighting factor R'$_i$ may be calculated by subtracting the average received signal power for the bin from the maximum possible received power range for that cell, designated M, and then normalizing this figure. In the present discussion, RSCP is used as an example received signal power. $R_i$ is thus calculated as M−AvgRSCP$_i$. In the case of 3G, cell power range is −25 dbm to QRSCPmin, which is equal to −100 dbm, resulting in a range value M of 75 dbm. R'$_i$ is calculated as $R_i$/M. For the total number of traffic samples, the appropriate weighting factor R' is calculated for each bin k from k=1 to k=B (the total number of bins). These weighting factors are applied to the sample numbers for each bin before being summed to provide the weighted total number of samples, as illustrated in the formula below.

The application of the above discussed weighting factors R is illustrated in FIG. 3d at steps 226bii and 226biv. In step 226bii, the CLP Function weights the number of traffic samples within the bin under consideration according to a relation between average measured received signal power for UEs located within the bin and a minimum received signal power required for access to the cell provisioned by the antenna. This may be performed by multiplying the number of samples in the bin by the weighting factor $R'_i$. In step 226biv, the CLP Function weights the total number of traffic samples within the coverage area according to a relation between the average received signal power for UEs located within all bins in the coverage area and the minimum received signal power required for cell access. This may be achieved by multiplying the number of samples for each bin by the appropriate weighting factor $R'_k$ for that bin, and then summing the weighted numbers of samples for all bins. The formula for calculating a normalized number of traffic samples within each propagation bin thus becomes, according to this second example:

$$s'_i = \frac{s_i * R'_i}{\sum_{1}^{B}(s_k * R'_k)}$$

Referring again to FIG. 3c, once the CLP Function has obtained a reference traffic distribution in step 226, the CLP Function then proceeds, at step 228 to calculate delta gain values for points on the elevation model by, for each point, subtracting the antenna attenuation at the proposed tilt angle from the antenna attenuation at the reference tilt angle. As discussed above, the points on the elevation model may be the average elevations at each propagation bin, as illustrated in step 228a and consistent with the attenuations calculated and/or determined at steps 212 and/or 222. Thus for a propagation bin i, and a vertical angle $\alpha_i$ to the average elevation at bin i, delta gain is calculated as:

$$\Delta G_{dB}^{\alpha i} = A_{dB}^{\alpha i} - A'_{dB}^{\alpha i}$$

Where:
$A_{dB}^{\alpha i}$=attenuation along direction $\alpha_i$ (degree) at reference tilt angle
$A'_{dB}^{\alpha i}$=predicted attenuation along direction $\alpha_i$ (degree) at proposed tilt angle.

The CLP Function then, at step 230, predicts a new traffic distribution within the coverage area by combining the calculated delta gains with the reference traffic distribution.

Figure 3E:
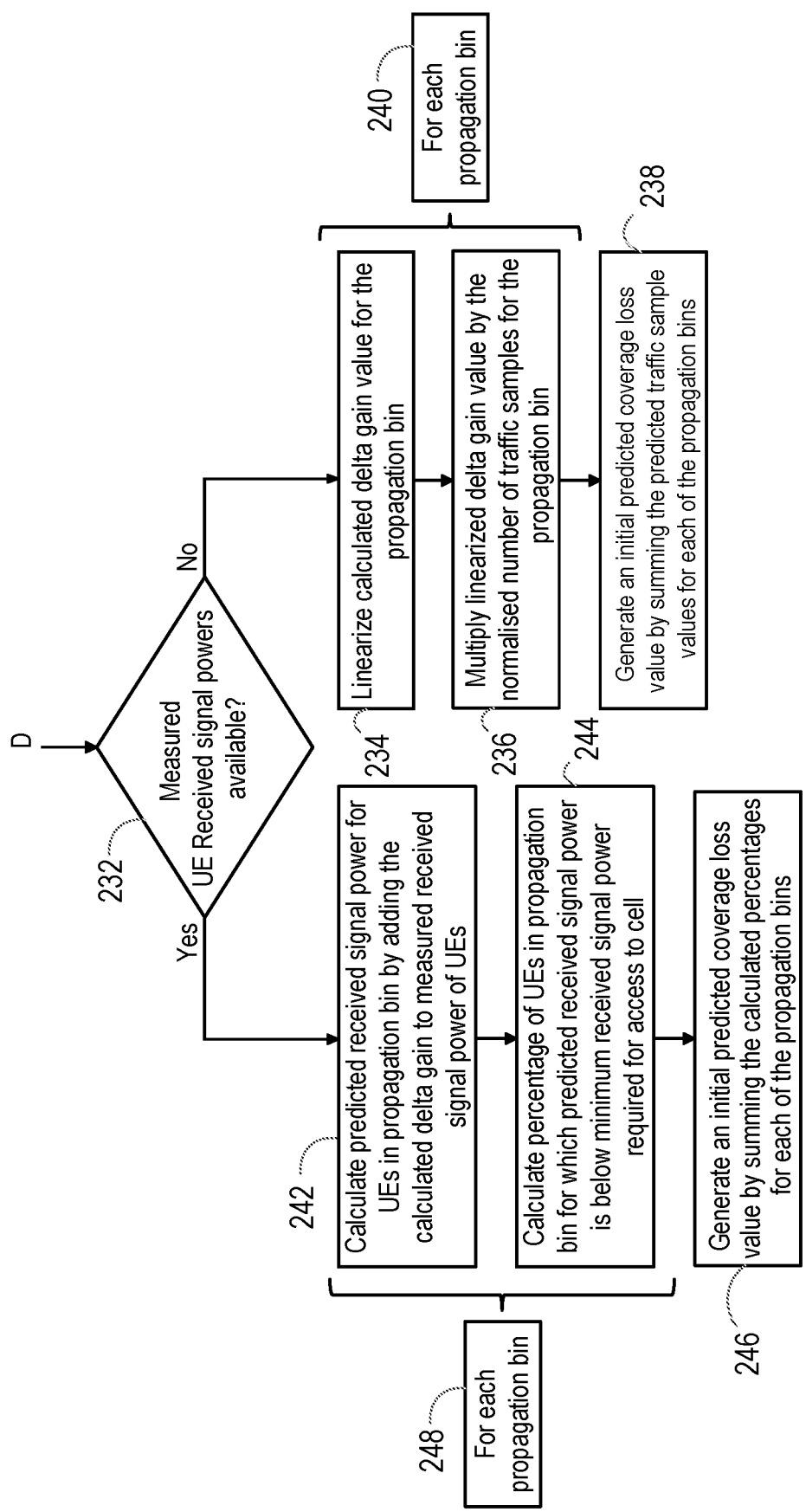

As illustrated in FIG. 3e, step 230 may be performed in different ways according to the nature of the reference traffic distribution and according to whether or not UE measurements are available and if so, what kind of UE measurements are available.

Figure 8:
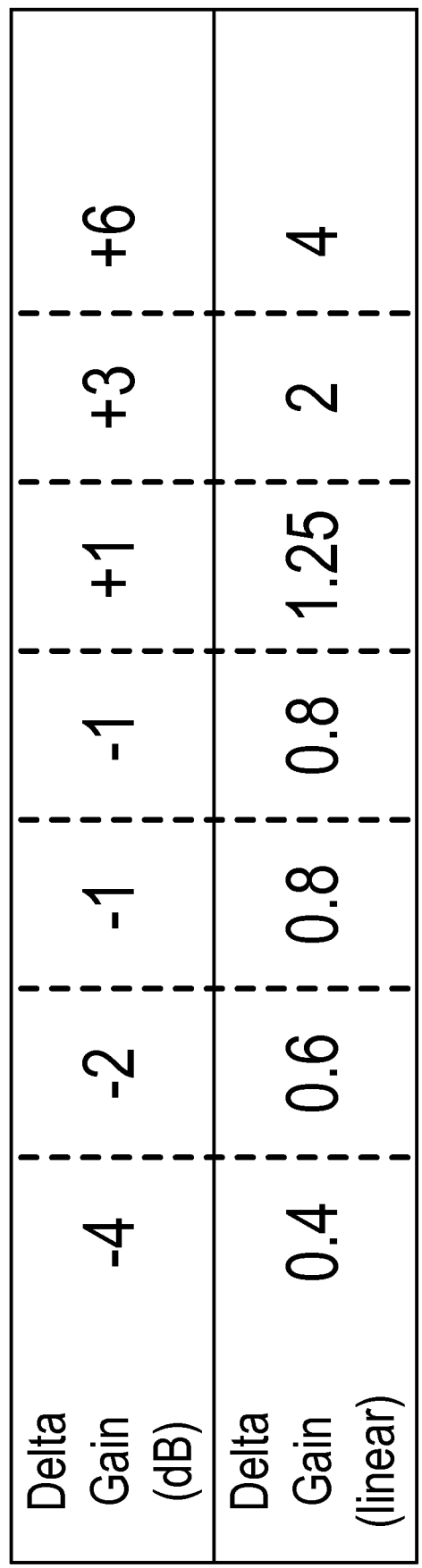
FIG. 8 illustrates delta gain values.
Figure 11:
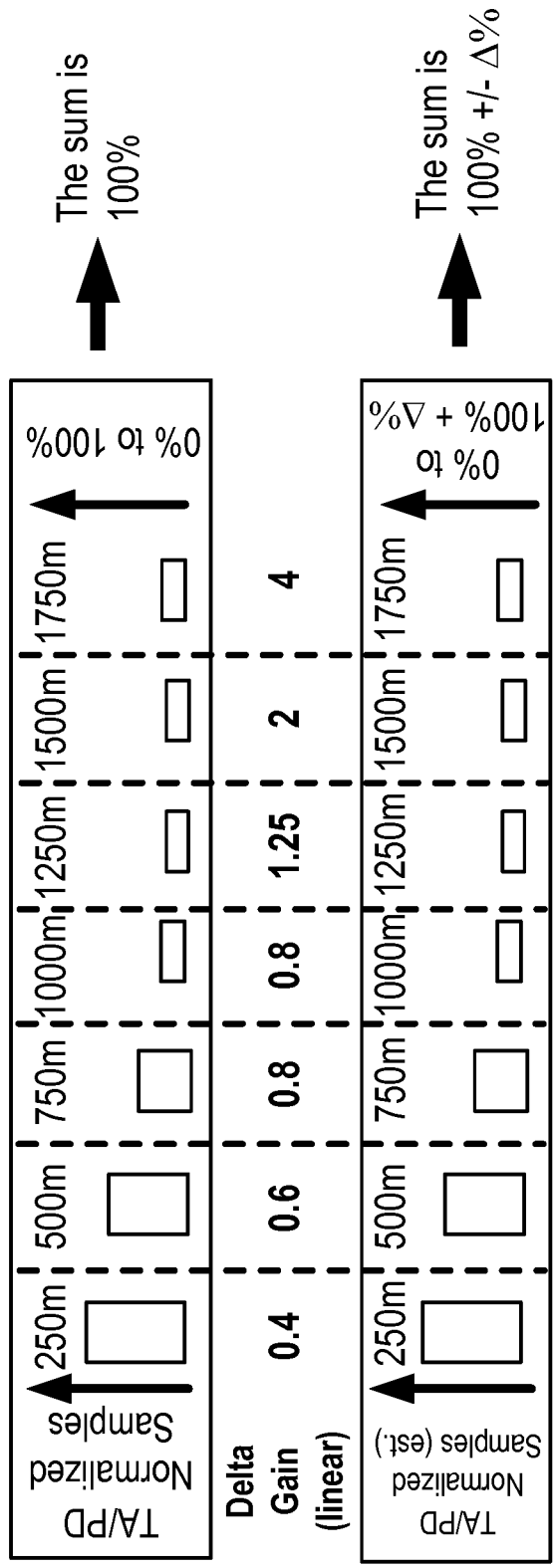
FIG. 11 illustrates calculation of a predicted traffic distribution.

Referring to FIG. 3e, in a first sub step 232, the CLP Function determines whether or not individual UE received signal power measurements are available. Such measurements may be obtained from UE Traces. If individual UE received signal powers are not available, then the CLP Function follows the right hand path of FIG. 3e, first linearising the calculated delta gain value for a propagation bin in step 234 and then multiplying in step 236 the linearised delta gain value by the normalized number of traffic samples for the propagation bin, as calculated in step 226b. The multiplication of the normalised number of traffic samples by the linearised delta gain value for the bin provides a projection of the number of samples that would be present in the bin if the proposed tilt angle was implemented. These steps are repeated for all propagation bins in step 240. A set of example delta gain values together with their linearised values is illustrated in FIG. 8. The calculation of predicted traffic sample values by multiplying the linearized delta gain values by the normalized traffic samples for each bin is illustrated FIG. 11. In step 238, the CLP Function generates an initial predicted coverage loss value, Coverage Loss Prediction_Initial or CLP_Initial, by summing the predicted traffic sample values for each propagation bin and subtracting 1:

$$CLP_{initial} = \left(\sum_i s'_i * \Delta G_{linear}^{\alpha_i}\right) - 1$$

Figure 12:
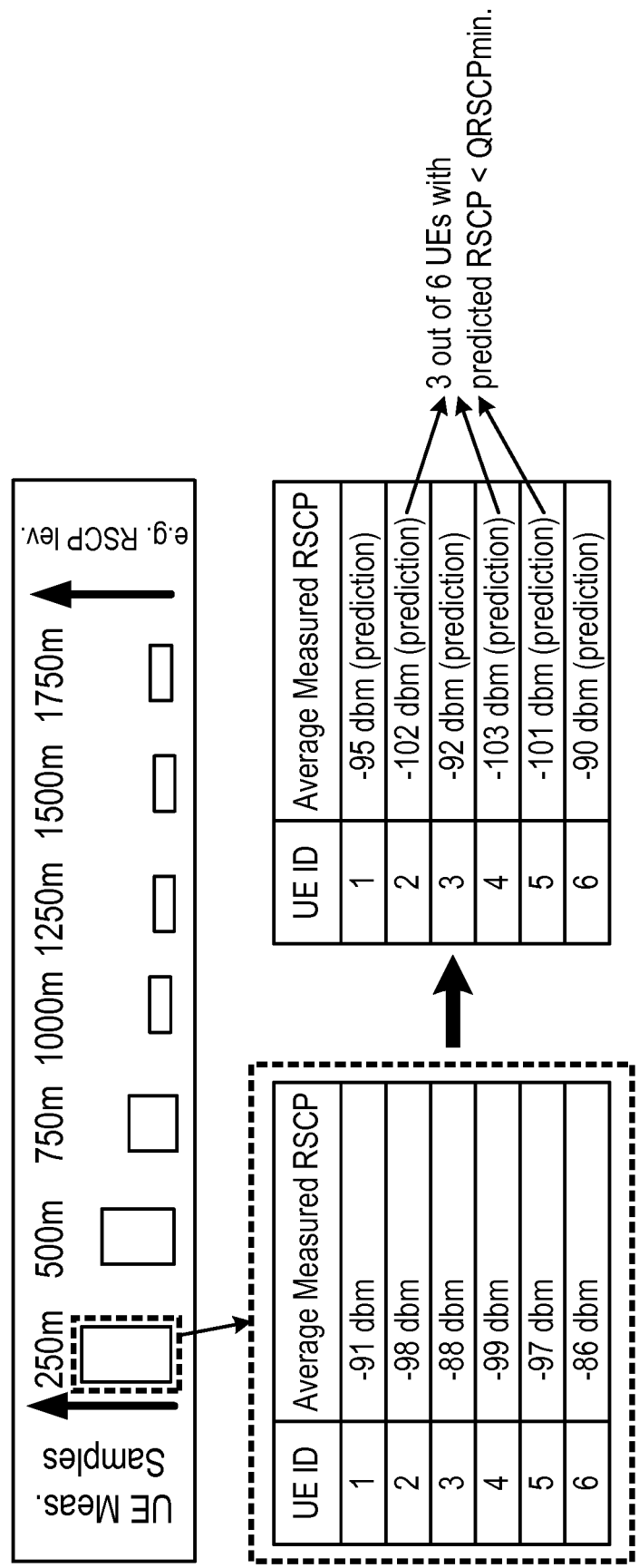
FIG. 12 illustrates calculation of an initial coverage loss prediction.

If individual UE received signal powers are available, then the CLP Function follows the left hand path of FIG. 3e, calculating a predicted received signal power for UEs in a propagation bin by adding the calculated delta gain for the propagation bin to the measured received signal power for UEs in the propagation bin in step 242. This step may be based on a reference traffic distribution calculated as set out in step 226a above. The CLP Function then, in step 244, calculates a percentage of UEs in the relevant propagation bin for which the predicted received signal power is below the minimum required for access to the cell, and which are therefore predicted to lose cell coverage. Steps 242 and 244 are then repeated for each propagation bin as shown at step 248. The calculations at step 242 and 244 are illustrated for an example propagation bin in FIG. 12. The example propagation bin has a calculated delta gain of −4 dbm for the change from the reference (current) tilt angle to the proposed tilt angle. Six UEs are illustrated for the example propagation bin, although it will be appreciated that in reality, the number of UEs is likely to be far higher. It can be seen on the left of FIG. 12 that many of the UEs in the example propagation bin have a measured received signal power approaching the 3G minimum of −100 dbm. Once the calculated delta gain of −4 dbm is applied, it is predicted that three of the UEs will have a received signal power of less than the minimum value, and therefore will lose cell coverage. Of the total 6 UEs, this means a predicted 50% of UEs will have a received signal power less than the minimum value for cell access. Referring again to FIG. 3e, once percentages have been calculated for each of the propagation bins, the CLP Function generates an Initial CLP, CLP_Initial by summing the calculated percentages for each of the propagation bins at step 246.

The above discussion of steps 242 to 246 assumes that measured received signal power is only available for UEs currently receiving signal from the antenna at a power above the minimum level for cell access. The above calculations do not therefore take account of UEs which may be located within the coverage area but not receiving signal from the antenna sufficiently strongly to have access to the cell. At least some of these UEs may be able to access the cell if an antenna tilt to a proposed tilt angle resulted in a positive delta gain. For example, a UE receiving at −101 dbm and thus below the 3G threshold of −100 dbm could have access to the cell in the event of a positive delta gain of 2 dbm. This positive delta gain would result in a predicted received signal power for the UE of −99 dbm, sufficient for cell access. UEs in this position may be considered in the above calculations if additional data is available, according for example to the Minimization Drive Test (MDT) 3GPP specification, according to which UEs will be able to collect out of coverage information and report this information to the network once back in coverage. If such MDT data are available, then out of coverage UEs may be included in the calculations at step 242 and 244, and so contribute to the generation of CLP_Initial.

Referring again to FIG. 3c, following step 230, implemented as illustrated in FIG. 3e, the CLP Function has generated a value for CLP_Initial, based either on summed predicted normalised traffic samples (as in step 238) or on summed percentages of UEs predicted to lose cell coverage (as in step 246). In step 250, the CLP Function calculates a final CLP value, CLP_Final, as a weighted sum of inputs including CLP_Initial. As illustrated in step 250a, the weighting coefficients for the weighted sum may be determined by a machine learning algorithm, which may select coefficients according to a category of the cell provisioned by the antenna, as illustrated at step 250b. The remaining inputs for the weighted sum may comprise features of the cell provisioned by the antenna, as illustrated at step 250c.

Figure 13:
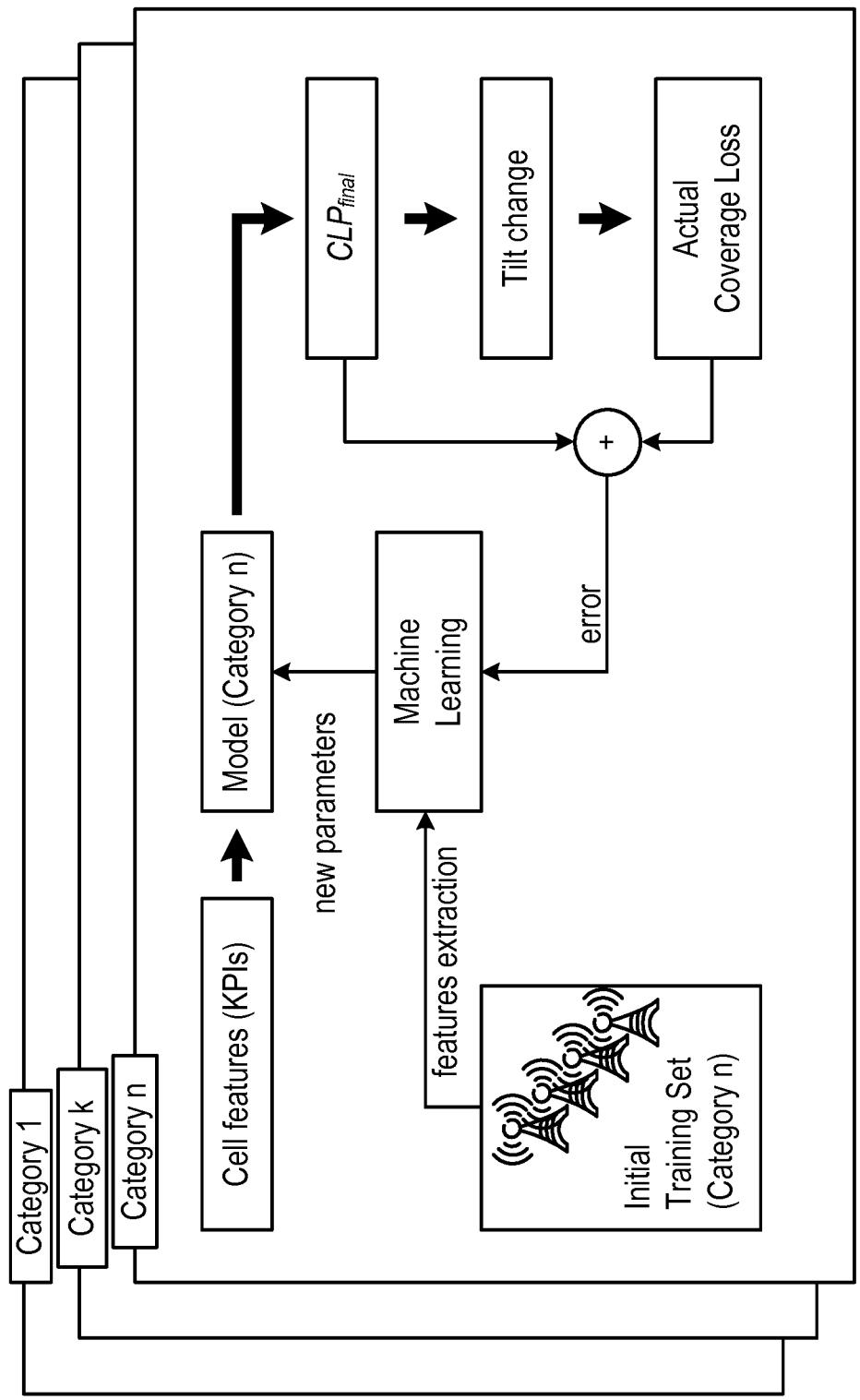
FIG. 13 is a block diagram representing a machine learning model.

The weighted sum of step 250 enables features related to the specific radio propagation environment of each cell under consideration to be taken into account in calculating the final coverage loss prediction. Cell features may include features related to cell configuration and to cell Key Performance Indicators (KPIs). FIG. 13 is a representation of a machine learning algorithm which may take such features into account in assembling a final coverage loss prediction for an antenna tilt change. Referring to FIG. 13, the machine learning algorithm accounts for cell configuration by grouping the cells into categories according to their configuration, and generating a dedicated machine learning model for each category. The number of cell configurations is relatively limited, and by grouping cells according to their cell configuration, the machine learning algorithm may effectively tailor the generated model to each category, with a dedicated training data set for each category. An example grouping of cells into categories is illustrated in Tables 1 and 2 below.

TABLE 1

Example of Cell Category Definition

| Category Feature | Possible Values |
|---|---|
| Cell Bandwidth (MHz) | [900, 2100] |
| Cell Technology | [3G] |
| Number of UARFCNs in the same sector/band | [1, 2, 3, 4] |
| Sector configuration (Number of band in the same sector) | [900, 2100, 900 + 2100] |
| Total Number of Categories (possible combinations) | 10 |

TABLE 2

Example of Cell Categories

| Category ID | Cell Bandwidth (MHz) | Cell Technology | Number of Carriers in the same sector/band | Sector Configuration |
|---|---|---|---|---|
| 1 | 900 | 3G | 1 | U900 |
| 2 | 900 | 3G | 1 | U2100 + U900 |
| 3 | 2100 | 3G | 1 | U2100 |
| 4 | 2100 | 3G | 1 | U2100 + U900 |
| 5 | 2100 | 3G | 2 | U2100 |
| 6 | 2100 | 3G | 2 | U2100 + U900 |
| 7 | 2100 | 3G | 3 | U2100 |
| 8 | 2100 | 3G | 3 | U2100 + U900 |
| 9 | 2100 | 3G | 4 | U2100 |
| 10 | 2100 | 3G | 4 | U2100 + U900 |

Cell features relating to cell KPIs are used as inputs to the weighted sum generated by the machine learning model. Examples cell KPIs are illustrated in Table 3 below.

TABLE 3

Example of Cell KPIs

| Cell KPI | Unit |
|---|---|
| Cell Range (e.g. based on the bin that represents the 95th percentile of the tot. samples) | Km |
| Power share of the cell within the same sector/band | % |
| Inter-site distance | Km |
| Traffic Voice Share within same sector/band | % |
| Traffic HSDPA Share within same sector/band | % |
| Traffic Voice | Erlang |
| Traffic HSDPA | Erlang |
| Average Active Set Size | Adimensional |
| Coverage Loss Probability (Initial) | % |

It can be seen CLP_Initial is one of the cell KPIs used as input to the weighted sum. The machine learning algorithm takes an input vector assembled from the cell KPIs as illustrated above. Example input vectors are illustrated in Table 4.

TABLE 4

Machine Learning input vectors

| Cell ID | Category ID | Cell Range | Power share | Inter-site distance | Traffic Voice Share | Traffic HSDPA Share | Traffic Voice | Traffic HSDPA | Average Active Set Size | CLP Initial | CL Actual |
|---|---|---|---|---|---|---|---|---|---|---|---|
| C1 | 6 | 1.2 | 0.32 | 3.6 | 0.24 | 0.4 | 60 | 40 | 1.2 | 0.25 | 0.14 |
| C2 | 4 | 2.4 | 0.4 | 0.9 | 0.35 | 0.5 | 120 | 41 | 1.34 | 0.14 | 0.11 |
| C3 | 3 | 4.6 | 0.1 | 1.5 | 0.2 | 0.2 | 20 | 11 | 1.1 | 0.17 | 0.12 |

It will be appreciated that the value for CL Actual, the actual coverage loss experienced following a change to the proposed antenna tilt angle, will only be present in the input vectors for the training set of data.

The model generated by the machine learning algorithm is in the form:

$$CLP_{final}=w_1*(\text{Cell Range})+w_2(\text{Power Share})+\ldots+w_9*(CLP_{initial})$$

Where $w_x$ are the coefficients representing the model.

If $CLP_{final}$ is positive, a coverage improvement is predicted, and if $CLP_{final}$ is negative then a coverage degradation is predicted. As discussed in further detail below, and as shown in FIG. 13, if on the basis of CLP_Final, a change to the proposed tilt angle is approved, then data regarding the actual coverage loss experienced after the change may be collected and input to the machine learning model to allow refining of the model for the relevant category, in effect using the new data as an additional training data set.

Figure 3F:
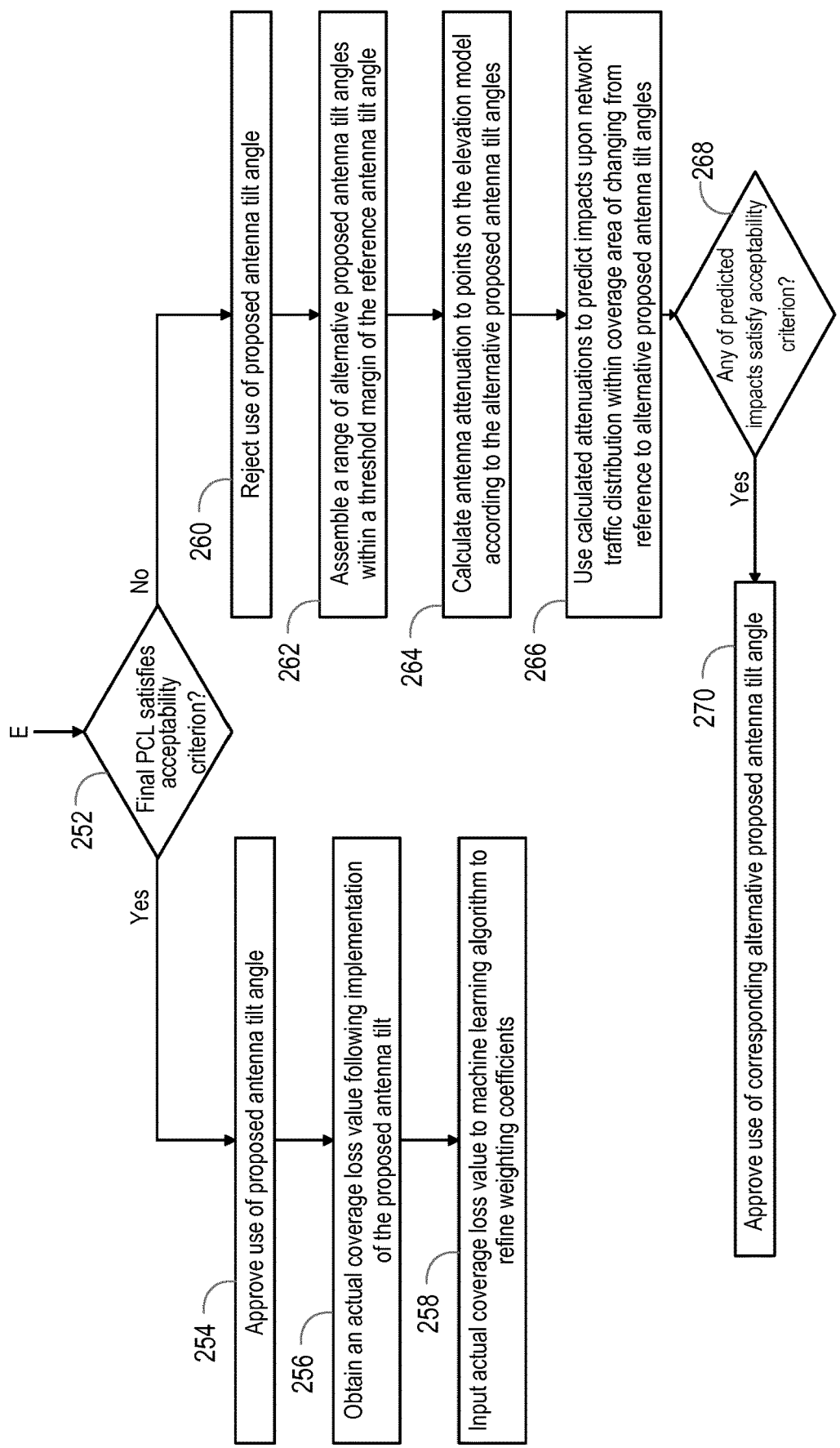

Referring now to FIG. 3f, following calculation of CLP_Final at step 250, the CLP Function assesses whether or not CLP_Final satisfies an acceptability criterion at step 252. The acceptability criterion may be configurable by network operators to reflect different deployment scenarios and operating conditions as well as Quality of Service (QoS) priorities. For example, in the event of failure of one or more network elements, highly adverse weather conditions or other exceptional circumstances, a mild coverage degradation may be acceptable. In other circumstances, only a coverage improvement may be acceptable. Thus if CLP final is positive, or if CLP final is negative but above an acceptability threshold, then the tilt proposal may be approved by the CLP Function at step 254, allowing the relevant automated or manual intervention to take place to change the antenna tilt to the proposed antenna tilt angle. Following this, an actual coverage loss value may be obtained at step 256 and input to the machine learning algorithm at step 258, allowing for refinement of the weighting coefficients of the machine learning model.

If the final coverage loss prediction CLP_Final does not satisfy the acceptability criterion, then the CLP Function rejects the proposed antenna tilt angle at step 260. The CLP Function may then, at step 262 assemble a range of alternative proposed antenna tilt angles within a threshold margin of the reference antenna tilt angle. The threshold margin may be set such that the proposed antenna tilt angles are sufficiently close to the reference antenna tilt angle that the reference traffic distribution obtained in step 226 remains valid. In step 264, the CLP Function calculates antenna attenuation to points on the elevation model according to the alternative proposed antenna tilt angles. This may be performed substantially as described above for the original proposed antenna tilt angle. In step 266, the CLP Function uses the calculated attenuations to predict impacts upon network traffic distribution within the coverage area of changing from the reference tilt angle to the alternative proposed tilt angles. Again, this calculation may be performed substantially as set out above for the original proposed antenna tilt angle. In step 268, the CLP Function assesses whether or not any of the predicted impacts satisfy the acceptability criterion. If any of the predicted impacts do satisfy the acceptability criterion, then use of the corresponding alternative proposed antenna tilt angle is approved by the CLP Function in step 270. Steps 262 to 270 thus allow for the CLP Function to propose an alternative antenna tilt angle to that supplied by a network operator or RET Function, in the event that the original proposed antenna tilt angle does not satisfy an acceptability criterion.

It will be appreciated that FIGS. 3a to 3f illustrate one way in which an example method according to the present disclosure may be implemented. Other examples may conduct certain steps in a different order to that discussed above and illustrated in the Figures.

Figure 14:
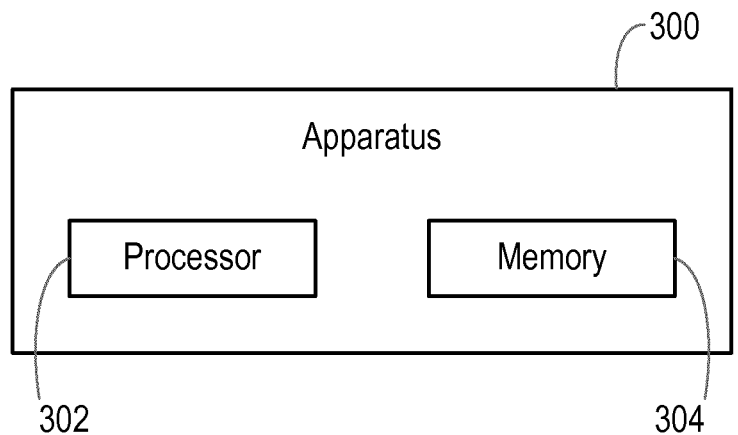
FIG. 14 is a block diagram illustrating functional units in an example of apparatus.

As discussed above, the methods 100, 200 may be performed by a CLP Function which may be implemented as a Virtualized Network Function (VNF) together with a SON RET function. The VNF may be centralized or distributed as appropriate. The CLP Function may alternatively be implanted as a function within a specific network element. FIG. 14 is a block diagram illustrating an example apparatus 300 which may implement the methods 100, 200 according to examples of the present disclosure, for example on receipt of suitable instructions from a computer program. Referring to FIG. 14, the apparatus comprises a processor 302 and a memory 304. The memory 304 contains instructions executable by the processor 302 such that the apparatus is operative to conduct the steps of the method 100 and or 200.

Figure 15:
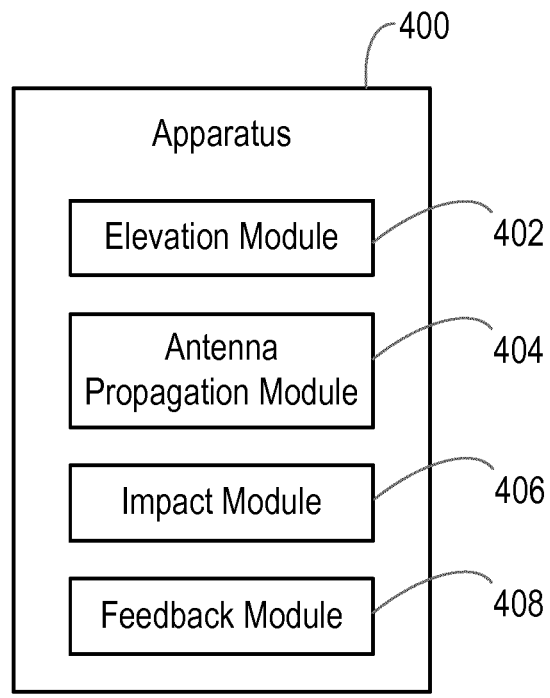
FIG. 15 is a block diagram illustrating functional units in another example of apparatus.

FIG. 15 illustrates functional units in another example of apparatus 400 which may execute examples of the methods 100, 200 of the present disclosure, for example according to computer readable instructions received from a computer program. It will be understood that the units illustrated in FIG. 15 are functional units, and may be realised in any appropriate combination of hardware and/or software. The units may comprise one or more processors and may be integrated to any degree.

Referring to FIG. 15, the apparatus comprises an elevation module 402 for obtaining an elevation model of the coverage area, and an antenna propagation module 404 for obtaining antenna attenuation to points on the elevation model according to a reference antenna tilt angle and a proposed antenna tilt angle. The apparatus further comprises an impact module 406 for using the calculated obtained attenuations to predict an impact upon network traffic distribution within the coverage area of changing from the reference to the proposed antenna tilt angle. The apparatus further comprises a feedback module 408 for approving use of the proposed antenna tilt angle if the predicted impact satisfies an acceptability criterion.

The elevation module 402 may be for dividing the coverage area into a plurality of propagation bins and calculating an average elevation of each propagation bin from elevation data for points within each bin.

The antenna propagation module 404 may be for, for each at least one of the reference antenna tilt angle and the proposed antenna tilt angle, obtaining a propagation pattern for the antenna at the relevant tilt angle, calculating a vertical angle from the antenna to points on the elevation model, and determining from the obtained propagation pattern the antenna attenuation at the calculated vertical angles.

The antenna propagation module 404 may be for, for the current antenna tilt angle, obtaining a measured received signal power at points on the elevation model, and calculating from the measured received signal power the antenna attenuation to the points on the elevation model.

The antenna propagation module 404 may be for determining whether a measured received signal power at points on the elevation model is available and if a measured received signal power at points on the elevation model is available, obtaining the measured received signal power at points on the elevation model; and calculating from the measured received signal power the antenna attenuation to the points on the elevation model at the current tilt angle. If a measured received signal power at points on the elevation model is not available, the antenna attenuation module 404 may be for obtaining a propagation pattern for the antenna at the current tilt angle, obtaining a vertical angle from the antenna to points on the elevation model; and determining from the obtained propagation pattern the antenna attenuation at the calculated vertical angles.

The impact module 406 may be for obtaining a reference traffic distribution within the coverage area, calculating delta gain values for points on the elevation model by, for each point, subtracting the antenna attenuation at the proposed tilt angle from the antenna attenuation at the reference tilt angle, and predicting a new traffic distribution within the coverage area by combining the calculated delta gains with the reference traffic distribution.

The impact module 406 may be for generating an initial predicted coverage loss value by summing predicted traffic sample values for each of the propagation bins, or by summing calculated percentages of User Equipments predicted to lose cell coverage for each of the propagation bins.

The impact module 406 may be for calculating a final predicted coverage loss value, wherein the final predicted coverage loss value comprises a weighted sum of inputs including the initial predicted coverage loss value.

The feedback module 408 may be for obtaining an actual coverage loss value following implementation of the proposed antenna tilt and inputting the actual coverage loss value to the machine learning algorithm to refine the weighting coefficients.

The feedback module 408 may be for rejecting use of the proposed antenna tilt angle if the predicted impact does not satisfy the acceptability criterion and for assembling a range of alternative proposed antenna tilt angles, the alternative proposed antenna tilt angles being within a threshold margin of the reference antenna tilt angle. The antenna attenuation module 404 may be for calculating antenna attenuation to points on the elevation model according to the alternative proposed antenna tilt angles and the impact module 406 may be for using the calculated attenuations to predict impacts upon network traffic distribution within the coverage area of changing from the reference to the alternative proposed antenna tilt angles. The feedback module 408 may be for approving use of an alternative proposed antenna tilt angle if its predicted impact satisfies the acceptability criterion.

Aspects of the present invention thus provide methods and apparatus enabling the evaluation of a proposed antenna tilt angle. Elevation data for the antenna coverage area may be used in combination with together with antenna propagation patterns and user traffic distribution in order to provide an accurate prediction of the impact for cell coverage of antenna tilt change proposals. Such proposals may then be approved or rejected on the basis of the predicted impact on cell coverage. By providing a more accurate prediction of the impact of a proposed antenna tilt angle, greater reliability of antenna tilt changes may be achieved, leading to improved network performance. An accurate prediction of coverage impact of an antenna tilt angle change enables traffic and coverage loss caused by inappropriate tilt angle changes to be avoided. Operator expenditure is reduced owing to reduced need for expensive drive tests and data analysis as well as reduced need for manual intervention. Additionally, the methods and apparatus of the present disclosure offer a robust and flexible solution that may be applied to both existing and future antenna models, as well as manual and automated antenna tilt angle proposals.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing tilt of an antenna providing network coverage over a coverage area, the method comprising:
    obtaining an elevation model of the coverage area, wherein obtaining the elevation model of the coverage area comprises:
        dividing the coverage area into a plurality of propagation bins; and
        calculating an average elevation of each propagation bin from elevation data for points within each bin, wherein the plurality of propagation bins extend radially outward from the antenna and each propagation bin spans an entire antenna beamwidth and extends from an inner boundary to an outer boundary;
    obtaining antenna attenuation to the points within each bin on the elevation model according to a reference antenna tilt angle and a proposed antenna tilt angle;
    using the obtained attenuations to predict an impact upon network traffic distribution within the coverage area of changing from the reference antenna tilt angle to the proposed antenna tilt angle; and
    approving use of the proposed antenna tilt angle when the predicted impact satisfies an acceptability criterion.

2. The method as claimed in claim 1, wherein the reference antenna tilt angle is a current antenna tilt angle.

3. The method as claimed in claim 2, wherein obtaining antenna attenuation to points on the elevation model according to the reference antenna tilt angle and the proposed antenna tilt angle comprises:
    for the current antenna tilt angle:
        obtaining a measured received signal power at points on the elevation model; and
        calculating from the measured received signal power the antenna attenuation to the points on the elevation model.

4. The method as claimed in claim 3, wherein obtaining the measured received signal power at points on the elevation model comprises at least one of:
    obtaining an average received signal power from User Equipments located within a threshold distance of points on the elevation model, or
    obtaining Traces from User Equipments located within a threshold distance of points on the elevation model.

5. The method as claimed in claim 2, wherein obtaining antenna attenuation to points on the elevation model according to the reference antenna tilt angle and the proposed antenna tilt angle further comprises:
  determining whether a measured received signal power at points on the elevation model is available; and
  if a measured received signal power at points on the elevation model is available,
    obtaining the measured received signal power at points on the elevation model; and calculating from the measured received signal power the antenna attenuation to the points on the elevation model at the current tilt angle; and
  if a measured received signal power at points on the elevation model is not available,
    obtaining a propagation pattern for the antenna at the current tilt angle; obtaining a vertical angle from the antenna to points on the elevation model; and
    determining from the obtained propagation pattern the antenna attenuation at the calculated vertical angles.

6. The method as claimed in claim 1, wherein obtaining antenna attenuation to points on the elevation model according to the reference antenna tilt angle and the proposed antenna tilt angle comprises:
  for at least one of the reference antenna tilt angle and the proposed antenna tilt angle:
    obtaining a propagation pattern for the antenna at the relevant tilt angle;
    calculating a vertical angle from the antenna to points on the elevation model; and
    determining from the obtained propagation pattern the antenna attenuation at the calculated vertical angles.

7. The method as claimed in claim 6, wherein calculating the vertical angle from the antenna to points on the elevation model comprises calculating a vertical angle from the antenna to the average elevation at each propagation bin.

8. The method as claimed in claim 1, wherein using the obtained attenuations to predict the impact upon network traffic distribution within the coverage area of changing from the reference to the proposed antenna tilt angle comprises:
  obtaining a reference traffic distribution within the coverage area;
  calculating delta gain values for points on the elevation model by, for each point, subtracting the antenna attenuation at the proposed tilt angle from the antenna attenuation at the reference tilt angle; and
  predicting a new traffic distribution within the coverage area by combining the calculated delta gains with the reference traffic distribution.

9. The method as claimed in claim 8,
  wherein obtaining the reference traffic distribution comprises obtaining a normalised number of traffic samples within each propagation bin;
  wherein calculating delta gain values for points on the elevation model comprises calculating a delta gain value for the average elevation of each propagation bin; and
  wherein predicting the new traffic distribution within the coverage area by combining the calculated delta gains with the reference traffic distribution comprises:
  for each propagation bin, calculating a predicted traffic sample value by:
    linearizing the calculated delta gain value for the propagation bin; and
    multiplying the linearized delta gain value by the normalised number of traffic samples for the propagation bin.

10. The method as claimed in claim 1, further comprising, if the predicted impact does not satisfy the acceptability criterion:
  rejecting use of the proposed antenna tilt angle;
  assembling a range of alternative proposed antenna tilt angles, the alternative proposed antenna tilt angles being within a threshold margin of the reference antenna tilt angle;
  calculating antenna attenuation to points on the elevation model according to the alternative proposed antenna tilt angles;
  using the calculated attenuations to predict impacts upon network traffic distribution within the coverage area of changing from the reference to the alternative proposed antenna tilt angles; and
  if any of the predicted impacts satisfy the acceptability criterion, approving use of the corresponding alternative proposed antenna tilt angle.

11. The method as claimed in claim 1, wherein the proposed antenna tilt angle is generated by one of:
  a network operator;
  an optimisation function.

12. A computer program comprising instructions which, when executed on at least one processor stored on a non-transitory computer readable medium, cause the at least one processor to carry out a method according to claim 1.

13. A computer program product comprising non transitory computer readable media having stored thereon a computer program as claimed in claim 12.

14. An apparatus for managing tilt of an antenna providing network coverage over a coverage area, the apparatus comprising a processor and a memory, the memory containing instructions executable by the processor such that the apparatus is operative to:
  obtain an elevation model of the coverage area, wherein in obtaining the elevation model of the coverage area the apparatus is operative to:
    divide the coverage area into a plurality of propagation bins; and
    calculate an average elevation of each propagation bin from elevation data for points within each bin, wherein the plurality of propagation bins extend radially outward from the antenna and each propagation bin spans an entire antenna beamwidth and extends from an inner boundary to an outer boundary:
  obtain antenna attenuation to the points within each bin on the elevation model according to a reference antenna tilt angle and a proposed antenna tilt angle;
  use the obtained attenuations to predict an impact upon network traffic distribution within the coverage area of changing from the reference antenna tilt angle to the proposed antenna tilt angle; and
  approve use of the proposed antenna tilt angle when the predicted impact satisfies an acceptability criterion.

15. The apparatus as claimed in claim 14, wherein in obtaining antenna attenuation to points on the elevation model according to the reference antenna tilt angle and the proposed antenna tilt angle the apparatus is operative to:
  for at least one of the reference antenna tilt angle and the proposed antenna tilt angle:
    obtain a propagation pattern for the antenna at the relevant tilt angle;

calculate a vertical angle from the antenna to points on the elevation model; and determine from the obtained propagation pattern the antenna attenuation at the calculated vertical angles.

16. The apparatus as claimed claim 14, wherein in using the obtained attenuations to predict the impact upon network traffic distribution within the coverage area of changing from the reference to the proposed antenna tilt angle the apparatus is operative to:

obtain a reference traffic distribution within the coverage area;

calculate delta gain values for points on the elevation model by, for each point, subtracting the antenna attenuation at the proposed tilt angle from the antenna attenuation at the reference tilt angle; and predict a new traffic distribution within the coverage area by combining the calculated delta gains with the reference traffic distribution.

17. The apparatus as claimed in claim 14, wherein if the predicted impact does not satisfy the acceptability criterion the apparatus is operative to:

reject use of the proposed antenna tilt angle;

assemble a range of alternative proposed antenna tilt angles, the alternative proposed antenna tilt angles being within a threshold margin of the reference antenna tilt angle;

calculate antenna attenuation to points on the elevation model according to the alternative proposed antenna tilt angles;

use the calculated attenuations to predict impacts upon network traffic distribution within the coverage area of changing from the reference to the alternative proposed antenna tilt angles; and if any of the predicted impacts satisfy the acceptability criterion, approving use of the corresponding alternative proposed antenna tilt angle.

* * * * *